US012693462B2

(12) United States Patent
Di Trapani

(10) Patent No.: US 12,693,462 B2
(45) Date of Patent: Jul. 28, 2026

(54) OPTICAL FILTER AND ARTIFICIAL LIGHT ILLUMINATION DEVICE FOR REPRODUCING THE LIGHT OF THE SKY AND THE SUN USING THE SAME

(71) Applicant: CoeLux S.r.l., Lomazzo (IT)

(72) Inventor: Paolo Di Trapani, Cavallasca (IT)

(73) Assignee: CoeLux S.r.l., Lomazzo (IT)

( * ) Notice: Subject to any disclaimer, the term of this patent is extended or adjusted under 35 U.S.C. 154(b) by 0 days.

(21) Appl. No.: 18/876,918

(22) PCT Filed: Jun. 30, 2023

(86) PCT No.: PCT/IB2023/056834
§ 371 (c)(1),
(2) Date: Dec. 19, 2024

(87) PCT Pub. No.: WO2024/009190
PCT Pub. Date: Jan. 11, 2024

(65) Prior Publication Data
US 2025/0377492 A1      Dec. 11, 2025

(30) Foreign Application Priority Data

Jul. 4, 2022    (IT) ........................ 102022000014155

(51) Int. Cl.
*G02B 5/22*       (2006.01)
*F21S 8/04*       (2006.01)
(Continued)

(52) U.S. Cl.
CPC .................. *G02B 5/22* (2013.01); *F21S 8/04* (2013.01); *F21V 9/02* (2013.01); *F21Y 2115/10* (2016.08)

(58) Field of Classification Search
CPC ...... G02B 5/22; G02B 3/0087; G02B 17/006; F21S 8/04; F21S 8/00; F21V 9/02; F21Y 2115/10
See application file for complete search history.

(56) References Cited

U.S. PATENT DOCUMENTS 4,761,062 A       8/1988  Loce et al.
10,134,817 B2 *  11/2018  Xu ........................ H05B 47/195
(Continued)

FOREIGN PATENT DOCUMENTS

GB            2509764 A       2/2013
WO        2014075721 A1       5/2014
(Continued)

OTHER PUBLICATIONS

International Search Report and Written Opinion of the European Patent Office, international application PCT/IB2023/056834, mailed Nov. 28, 2023, 14 pages total.

*Primary Examiner* — Evan P Dzierzynski
(74) *Attorney, Agent, or Firm* — DiBerardino McGovern IP Group LLC

(57)       ABSTRACT

The present invention refers to an optical filter (100) comprising an inlet surface (101) and an outlet surface (102) which are substantially flat and parallel, a plurality of locally planar and mutually locally parallel visible light absorbing sectors (108) extending between the inlet surface (101) and the outlet surface (102) for a sector length (L), and a plurality of solid transparent sectors (103) made with at least one solid material transparent to visible light, each transparent sector (103) of the plurality of transparent sectors (103) being interposed between two absorbing sectors (108) to create an alternation of transparent sectors (103) and absorbing sectors (108) adjacent to and in contact with each other, wherein each visible light absorbing sector (108) of the
(Continued)

plurality of visible light absorbing sectors (108) borders at most two transparent sectors (103) of the plurality of transparent sectors (103), and/or wherein a distance between adjacent absorbing sectors (108) of the plurality of absorbing sectors (108) is substantially constant, wherein each transparent sector (103) of the plurality of transparent sectors is locally arranged and configured to have such a refractive power that, given a first collimated light (201) which impinges on the inlet surface (101) along an incidence direction (D) at a local region of the inlet surface (101), the transparent sector (103) focuses the first collimated light (201) along a first focal line (203) orthogonal to a local plane of incidence (P), and/or gives a second collimated light (202) which impinges the outlet surface (102) along an incidence direction (D) at a local region of the inlet surface (101), the transparent sector (103) focuses the second collimated light (202) along a second focal line (204) orthogonal to a local plane of incidence (P), wherein a plane orthogonal to the inlet surface (101) and containing a normal (N) to an absorbing sector (108) of the plurality of absorbing sectors D at the local region of the inlet surface (101) defines the local plane of incidence (P), and the intersection between the local plane of incidence (P) and the surface of an absorbing sector (108) defines the incidence direction (D) substantially common to the whole inlet surface (101).

17 Claims, 9 Drawing Sheets

(51) Int. Cl.
    *F21V 9/02*        (2018.01)
    *F21Y 115/10*      (2016.01)

(56) References Cited

U.S. PATENT DOCUMENTS

| | | | |
|---|---|---|---|
| 2013/0050798 A1* | 2/2013 | Kim | G02F 1/1533 |
| | | | 359/275 |
| 2015/0138457 A1* | 5/2015 | Kroon | G02B 30/25 |
| | | | 359/463 |
| 2018/0259799 A1* | 9/2018 | Kroon | G02F 1/1323 |

FOREIGN PATENT DOCUMENTS

| | | |
|---|---|---|
| WO | 2015172794 A | 11/2015 |
| WO | 2015172794 A1 | 11/2015 |
| WO | 2017050631 A1 | 3/2017 |

* cited by examiner

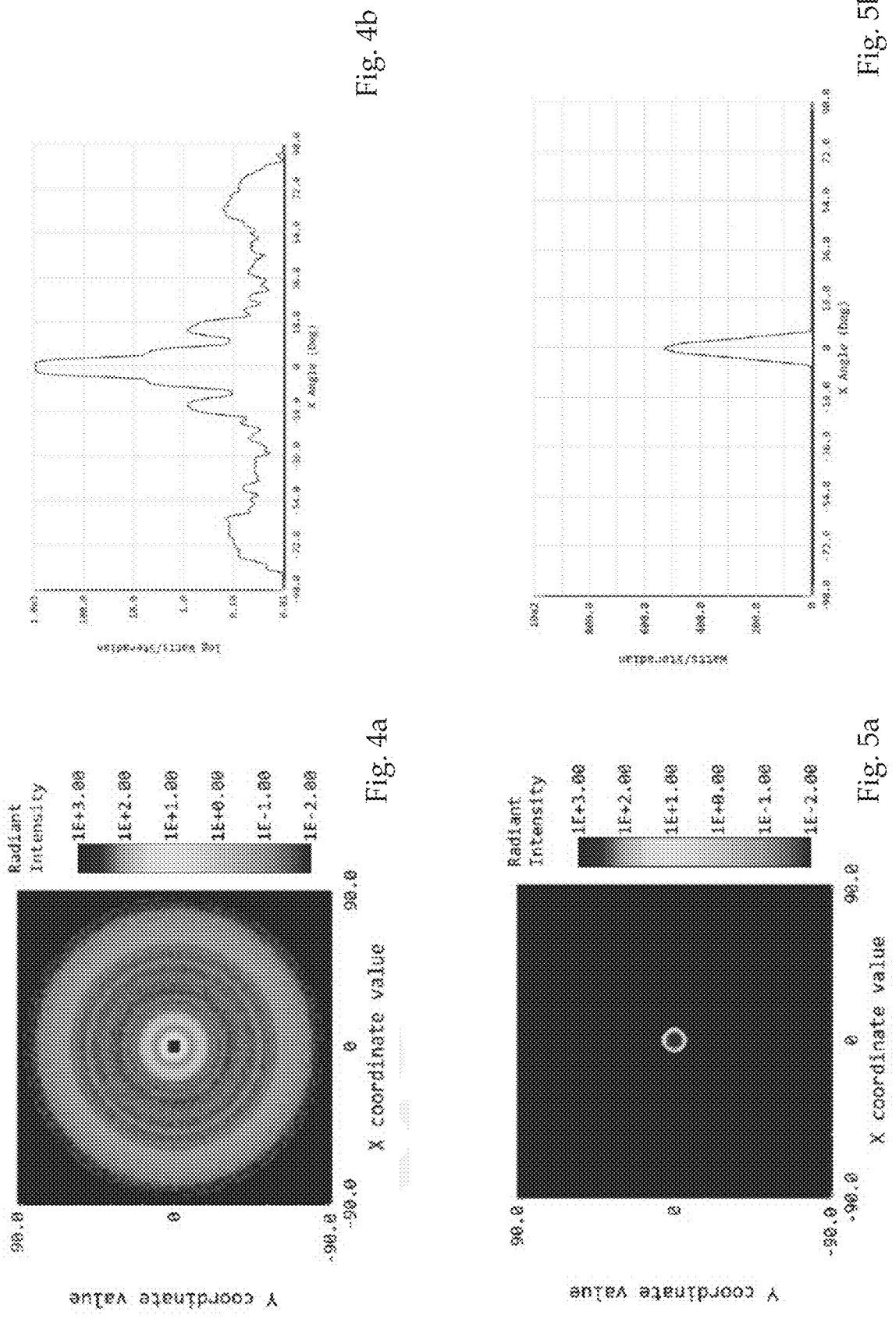

OPTICAL FILTER AND ARTIFICIAL LIGHT ILLUMINATION DEVICE FOR REPRODUCING THE LIGHT OF THE SKY AND THE SUN USING THE SAME

TECHNICAL FIELD

The present invention refers in general terms to a new optical filter and in particular to an optical filter particularly suitable for obtaining the effect of a uniform and clear sky in the illumination devices dedicated to the artificial reproduction of the natural light of the sky and the sun, as well as for eliminating the low angle glare effect in ceiling illumination devices, or for preventing the side view of a display.

BACKGROUND ART

The main characteristics of a device adapted to reproduce the natural light of the sky and the sun comprises in particular, the ability to produce an image of the sun perceived by the observer like at an infinite distance and the image of a clear sky in sharp contrast to the sun. To this end, the Applicant has indicated as a possible approach, in International Application No. WO 2014/075721, the one of producing a direct or collimated light, which simulates sunlight, characterized by a spatially uniform angular luminance profile and by a direct light CCT (Calibrated Color Temperature), and a diffused light also spatially uniform which simulates the light of the sky at a diffused light CCT significantly greater than the direct light CCT.

In order to obtain the necessary effects to reproduce the natural light by means of a compact, light and economical device, hitherto not yet industrially produced according to market standards, the Applicant has proposed to illuminate a nano-structured diffuser panel by means of a plurality of suitably collimated LED sources. In order to make the presence of a plurality of different sources hardly perceptible, so as to be able to obtain luminance uniformity necessary to produce the image of a single sun infinitely, the Applicant suggested in WO 2015/172794 the use of a homogenizing filter made with a pair of lens arrays coupled and spaced apart from each other by the common focal length, also called "tandem filter" or "fly's eye condenser". However, this solution suffers from the well-known problem due to the cross talk between adjacent channels, which causes the generation of a plurality of ghost images of the sun. In order to compact, lighten and reduce the costs of the device, the Applicant has also suggested the use of Fresnel optics instead of conventional optics for the collimation of the direct light. This solution, however, has the limit of producing an important spurious light, or straylight, which by propagating at angles greater than those useful for reproducing the image of the sun, produces a direct light background that reduces the contrast between the image of the sky and of the sun, creating an image of a diffused sun in a dark sky or the presence of unnatural streaks of light in the sky. A solution suggested by the Applicant in order to solve at least in part the aforementioned problems is to employ a two-dimensional multi-channel spatial filter with absorbing channels, which is formed by a two-dimensional matrix of empty channels separated from one another by absorbing walls, for example a honeycomb filter, as a solution for removing both the ghost images produced by the tandem filter and the spurious light produced by the Fresnel optics. The solution, however, presents the triple problem (i) of having a low transmission efficiency, i.e. a 50% transmission for an incident light with a constant luminance profile for directions within the angular acceptance cone of the filter, (ii) of being of complex manufacture and therefore of high cost due to the high value of the length/diameter ratio of the channels which is necessary to produce a realistic image of the sun, and (iii) of creating in turn a spatially modulated luminance pattern, wherein the Applicant has suggested the use of low angle diffuser filters (frost) to remove it. As indicated by the Applicant, such low angle diffusers have the further advantage of allowing to transform the image of a square sun, such as the image that is obtained with an optic that infinitely projects the image of the LED, or the image of a hexagonal sun, such as the image that is obtained by using a hexagonal cell tandem filter, into an image of a round sun, as is customary within the optic of reproducing a credible image of the sun. Such low angle diffusers inevitably deteriorate the contrast, however, creating a blurred image of the sun, as happens in nature in the presence of fog or haze.

SUMMARY OF THE INVENTION

The Applicant has surprisingly noticed that spurious light typically present in the devices adapted to reproduce the image of the sky and of the sun, such as the spurious light produced by Fresnel optics, is not statistically uniform and/or isotropic. In contrast, the spurious light typically emerges from particular points of the optical system along certain known directions. The Applicant has therefore noted that the removal of the spurious light may require optical filtering systems much simpler and more inexpensive than those hitherto considered and/or able to offer a luminous transmittance clearly higher than 50% for an incident light with a constant luminance profile for directions within the angular acceptance cone of the filter.

The task of the present invention is therefore to devise an optical filter capable of overcoming the drawbacks of the state of the art.

Within the scope of this task, an aim of the present invention is to devise an optical filter capable of allowing the realization of an illumination device for reproducing the natural light of the sky and the sun that is inexpensive, compact and capable of producing an image of the sun and of the clear sky in sharp contrast with the sun and with the image of the sun perceived at an infinite distance.

Another aim of the present invention is to realize an optical filter useful for effectively and efficiently eliminating the problem of the straylight of the Fresnel collimators, for example of the radial type Fresnel collimators, such as those used to collimate the light produced by an LED source, or of linear type, such as those used to deviate the direction of propagation of the light in a pattern in transmission or reflection in order to compact the size of the device.

A further aim of the present invention is to devise an optical filter which, when employed in an illumination device for reproducing the natural light of the sky and the sun, makes superfluous the use of tandem filters and/or of multi-channel spatial filters with absorbing channels and/or of filters, the use of low angle diffuser filters.

Still an aim of the present invention is to devise an optical filter which, in combination with a Fresnel collimator illuminated in its focus by a square or rectangular source, or of any other shape, infinitely produces the image of a circular source and therefore of a round sun.

Last but not least, an aim of the present invention is to realize an anti-glare filter to be generically employed in the lighting sector to eliminate the light emitted by the wide-angle illuminating devices with respect to the main emission direction.

Still an aim of the present invention is to realize a privacy filter with high efficiency and high angular selectivity for the displays.

it is further an aim of the present invention to develop an illumination device for reproducing the natural light of the sky and the sun which is inexpensive, compact and capable of producing an image of the sun and of the clear sky in sharp contrast to the sun and to the image of the sun perceived at an infinite distance.

These and other aims of the present invention are achieved by means of an optical filter for illumination devices for reproducing the natural light of the sky and the sun incorporating the features of the appended claims, which form an integral part of the present description.

In accordance with a first aspect thereof, the invention therefore concerns a multilayer optical filter with absorbing sectors comprising an inlet surface and an outlet surface which are substantially flat and parallel, a plurality of locally planar and mutually locally parallel visible light absorbing sectors extending between the inlet surface and the outlet surface for a sector length, and a plurality of solid transparent sectors made with at least one solid material transparent to visible light, each transparent sector of the plurality of transparent sectors being interposed between two absorbing sectors to create an alternation of transparent sectors and absorbing sectors adjacent to and in contact with each other, wherein each transparent sector of the plurality of transparent sectors is locally arranged and configured to have such a refractive power that, given a first collimated light which impinges on the inlet surface along an incidence direction at a local region of the inlet surface of the optical filter, the transparent sector focuses the first collimated light along a first focal line orthogonal to a local plane of incidence and/or given a second collimated light which impinges on the outlet surface along an incidence direction at a local region of the inlet surface of the optical filter, the transparent sector focuses the second collimated light along a second focal line orthogonal to a local plane of incidence, and/or wherein there is at least one third collimated light which, by impinging on the inlet surface at a local region of the inlet surface and along an inlet direction comprised in the plane of incidence and deviated with respect to the incidence direction by a non-zero angle of incidence $\delta_{in}$ and in any case smaller than an acceptance angle of the filter $\vartheta_{acc}$ measured with respect to the incidence direction D, produces at least one transmitted light component that exits from the outlet surface along a direction comprised in the plane of incidence and deviated with respect to the incidence direction by a deviation angle $\delta_{out}$ such that $$\frac{\delta_{in}}{|\delta_{in}|} = -\frac{\delta_{out}}{|\delta_{out}|}$$

apples ana where the luminous transmittance for the third collimated light is significantly higher than 50%, preferably higher than 60%, more preferably higher than 70% net of losses due to reflections on the entrance and/or exit surfaces, and/or wherein there is at least one fourth collimated light which, by impinging on the outlet surface at a local region of the outlet surface and along an inlet direction comprised in the plane of incidence and deviated with respect to the incidence direction of a non-zero angle of incidence $\delta_{in}$ and in any case smaller than an acceptance angle of the filter $\vartheta_{acc}$ measured with respect to the incidence direction D, produces at least one transmitted light component that exits from the inlet surface along a direction comprised in the plane of incidence and deviated with respect to the incidence direction by a deviation angle $\delta_{out}$ such that $$\frac{\delta_{in}}{|\delta_{in}|} = -\frac{\delta_{out}}{|\delta_{out}|}$$

applies and where the luminous transmittance for the fourth collimated light is significantly higher than 50%, preferably higher than 60%, more preferably higher than 70% net of losses due to reflections on the inlet and outlet surfaces, wherein a plane orthogonal to the inlet surface and containing a normal to an absorbing sector of the plurality of absorbing sectors at the local region of the inlet surface of the optical filter defines the local plane of incidence, and the intersection between the local plane of incidence and the surface of an absorbing sector defines the incidence direction, substantially common to the entire optical filter.

In the context of the present description and in the appended claims, by local region of the inlet surface is meant a region where a normal to an absorbing sector of the plurality of absorbing sectors has a substantially constant direction.

In the context of the present description and in the appended claims, the condition "focuses a collimated light along a focal line orthogonal to a local plane of incidence" is considered occurred if there is a focal plane parallel to the inlet and/or outlet surface where the illuminance profile is characterized by a contrast along a direction orthogonal to the focal line and/or by an illuminance peak value respectively greater than the contrast and/or the illuminance peak value obtained in any other plane parallel to the inlet and/or outlet surface behind or in front of the focal plane.

In the context of the present description and in the appended claims, "acceptance angle $\vartheta_{acc}$" is intended to indicate the angle such that a light which impinges on the inlet or outlet surface along a direction comprised in the plane of incidence at an angle of incidence $\delta_{in}$ greater than $\vartheta_{acc}$ produces a luminous transmittance lower than 15%. In the context of the present description and in the appended claims, "acceptance cone" or "angular acceptance cone" is intended to indicate the set of directions comprised in the plane of incidence which form with the incidence direction D an angle of incidence $\delta_{in}$ smaller than the acceptance angle $\vartheta_{acc}$.

In the context of the present description and in the appended claims, by "non-zero angle of incidence $\delta_{in}$" is intended to indicate an angle greater than 0.1 $\vartheta_{acc}$, preferably greater than 0.2 $\vartheta_{acc}$, more preferably 0.4 $\vartheta_{acc}$.

In the context of the present description and in the appended claims, the angles correlated to the direction of light propagation are meant to be measured in air.

Advantageously, the optical filter according to the present invention has a locally one-dimensional structure. It is therefore less expensive and more easily manufacturable than a two-dimensional multi-channel spatial filter with absorbing channels. The Applicant has in fact noted that the manufacturing process does not present particular complexity as the length L of the sectors increases, as instead happens as the length of the channels increases in the case of two-dimensional multi-channel spatial filters with absorbing channels.

The Applicant has noted that, specifically, the optical filter according to the present invention comprises absorbing sectors configured and positioned to ensure an absorbing effect on the light that locally reaches the inlet and/or outlet surface that is maximum for directions belonging to the local plane of incidence, and in particular for inlet directions belonging to the local plane of incidence and external to an acceptance angle of the filter measured with respect to the incidence direction, and it is minimum for directions belonging to a plane orthogonal to the local filtering direction, said local filtering direction being defined as the normal to the absorbing sector at a local region of the inlet surface of the optical filter.

Therefore, advantageously the optical filter subject-matter of the present invention is able to efficiently remove the spurious light generated by a Fresnel lens or mirror, or in general by a Fresnel optic. A Fresnel optic is in fact typically characterized by a prismatic structure with the edges locally oriented along a direction that defines a local plane of Fresnel incidence orthogonal thereto, such prisms being configured to collimate, deviate or in any case modify the direction of the light in the local plane of Fresnel incidence. An optical filter according to the present invention, configured such that at each point the local plane of incidence of the filter coincides with the local plane of incidence of the Fresnel optic, is able to efficiently remove the straylight produced by the Fresnel optic, and in particular produced by the edges of the prismatic structure, because such straylight emerges from the Fresnel optic at each point substantially only along directions belonging to the local plane of Fresnel incidence, therefore of the filter.

The Applicant has acknowledged that the optical filter configured in such a way that the absorbing sectors operate selectively on the single plane where the straylight is present guarantees the minimum level of losses on the main light, for example a much lower level of losses than that of a two-dimensional multi-channel spatial filter with absorbing channels configured to remove the straylight with equal selectivity in the local plane of Fresnel incidence. Furthermore, the refractive power of the transparent sectors of the optical filter according to the present invention means that at least a part of the light that would otherwise be absorbed by the absorbing sectors is instead transmitted here, conferring the filter greater luminosity and efficiency than in the case of traditional optical filters made with transparent sectors without refractive power.

The task set out above, as well as the aims of the present invention are also achieved by an illumination device for reproducing the light of the sky and the sun.

Further features of the preferred embodiments of the optical filter and of the illumination device according to the present invention are the subject-matter of the dependent claims.

BRIEF DESCRIPTION OF THE DRAWINGS

The accompanying drawings, which are incorporated herein and constitute part of the description, illustrate exemplary embodiments of the present invention and, together with the description, are intended to illustrate the principles of the present invention.

In the drawings:

FIGS. 4a and 4b are two graphs representing respectively the angular profile of luminous intensity and a relative section containing the central peak of a light generated by a square LED source positioned in the focus of a radial Fresnel lens and collimated by it;

FIGS. 5a and 5b are two graphs representing respectively the angular profile of luminous intensity and a relative section containing the central peak of a light generated by a square LED source positioned in the focus of a radial Fresnel lens, collimated by it and filtered by means of an optical filter according to the present invention;

DETAIL DESCRIPTION

Figure 1:
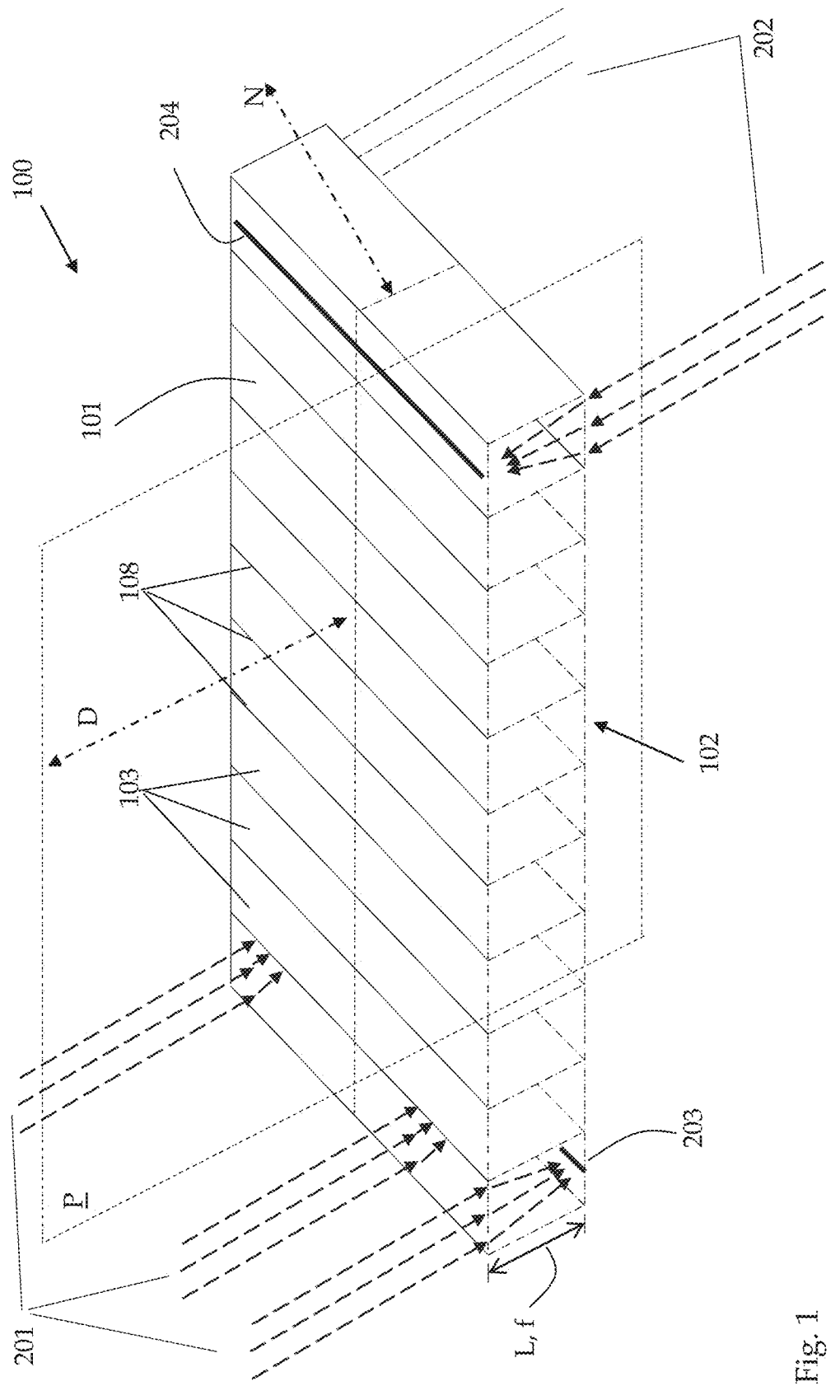
FIG. 1 is a schematic perspective view of a first embodiment of an optical filter according to the present invention.

The following is a detailed description of exemplary embodiments of the present invention. The exemplary embodiments described herein and illustrated in the drawings are intended to convey the principles of the present invention, allowing the person skilled in the art to implement and use the present invention in numerous different situations and applications. Therefore, the exemplary embodiments are not intended, nor should they be considered, to limit the scope of patent protection. Rather, the scope of patent protection is defined by the accompanying claims.

For the illustration of the drawings, use is made in the following description of identical numerals or symbols to indicate construction elements with the same function. Moreover, for clarity of illustration, some references may not be repeated in all drawings.

The use of "for example", "etc.", "or" indicates non-exclusive alternatives without limitation, unless otherwise indicated. The use of "comprises" and "includes" means "comprises or includes, but not limited to", unless otherwise indicated.

Furthermore, the use of measurements, values, shapes and geometric references (such as perpendicular and parallel) associated with terms such as "about", "almost", "substantially" or the like, is to be understood as "unless there are measurement errors" or "unless there are inaccuracies due to manufacturing tolerances" and in any case "unless there is a slight divergence with respect to the values, measurements, shapes or geometric references" to which the term is associated.

Finally, terms such as "first", "second", "upper", "lower", "main" and "secondary" are generally used to distinguish components belonging to the same type, not necessarily implying an order or priority of relationship or position.

With reference to the attached figures, there are schematically illustrated some embodiments of an optical filter according to the present invention overall indicated with 100.

The optical filter 100 comprises an inlet surface 101 and an outlet surface 102 which are substantially flat and parallel. Between the inlet surface 101 and the outlet surface 102 there extend for a sector length L a plurality of locally planar and mutually locally parallel visible light absorbing sectors 108, and a plurality of solid transparent sectors 103, made with at least one solid material transparent to visible light. Each transparent sector 103 of the plurality of transparent sectors is interposed between two absorbing sectors 108 to create an alternation of transparent sectors 103 and absorbing sectors 108 adjacent to and in contact with each other. In particular, the absorbing sectors 108 are arranged such that a distance between adjacent absorbing sectors 108 of the plurality of absorbing sectors 108 is substantially constant.

According to the present invention each transparent sector 103 of the plurality of transparent sectors is locally arranged and configured to have such a refractive power that, given a first collimated light 201 which impinges on the inlet surface 101 along an incidence direction D at a local region of the inlet surface 101 of the optical filter 100, the transparent sector 103 focuses the first collimated light 201 along a first focal line 203 orthogonal to a local plane of incidence P and/or given a second collimated light 202 which impinges on the outlet surface 102 along an incidence direction D at a local region of the inlet surface 101 of the optical filter 100, the transparent sector 103 focuses the second collimated light 202 along a second focal line 204 orthogonal to a local plane of incidence P, as schematically illustrated in FIGS. 1 and 1$a$.

Specifically, the local plane of incidence is defined by a plane orthogonal to the inlet surface 101 and containing a normal N to an absorbing sector 108 of the plurality of absorbing sectors at a local region of the inlet surface 101 of the optical filter 100. Furthermore, the intersection between the local plane of incidence P and the surface of an absorbing sector 108 defines the incidence direction D. The incidence direction D may be parallel or inclined with respect to the normal to the inlet 101 and outlet 102 surfaces.

In an embodiment of the present invention, each transparent sector 103 of the plurality of transparent sectors is locally arranged and configured to have such a refractive power that given the first collimated light 201 which impinges on the inlet surface 101 along the incidence direction D at a local region of the inlet surface 101 of the optical filter 100, the transparent sector 103 focuses the first collimated light 201 along a first focal line 203 orthogonal to the local plane of incidence P and positioned at a first focal length $f_1$ from the inlet surface 101 measured along the incidence direction D, such that the first focal length $f_1$ fulfils the following relation $0.5 \, L < f_1 < 2 \, L$, preferably $0.7 \, L < f_1 < 1.6 \, L$, more preferably $0.7 \, L < f_1 < 1.4 \, L$, even more preferably $0.9 \, L < f_1 < 1.2 \, L$. In a further preferred embodiment, the first focal length $f_1$ is substantially equal to the sector length L.

Alternatively or additionally, each transparent sector 103 of the plurality of transparent sectors is locally arranged and configured to have such a refractive power that, given a second collimated light 202 which impinges on the outlet surface 102 along the incidence direction D at a local region of the inlet surface 101 of the optical filter 100, the transparent sector 103 focuses the second collimated light 202 along a second focal line 204 orthogonal to the local plane of incidence P and positioned at a second focal distance $f_2$ from the outlet surface 102 measured along the incidence direction D, such that the second focal length $f_2$ fulfils the following relation $0.5 \, L < f_2 < 2 \, L$, preferably $0.7 \, L < f_2 < 1.6 \, L$, more preferably $0.7 \, L < f_2 < 1.4 \, L$, even more preferably $0.9 \, L < f_2 < 1.2 \, L$. In a further preferred embodiment, the second focal length $f_2$ is substantially equal to the sector length L.

Within the scope of the present description and of the appended claims, by first $f_1$ and second $f_2$ focal length is meant the distance measured along the incidence direction D respectively of the first 203 and of the second 204 focal line from the respective inlet 101 or outlet 102 surface, wherein the first 203 and the second 204 focal line are contained in a respective plane parallel to the inlet 101 and outlet 102 surfaces; this distance is measured by illuminating the respective inlet 101 or outlet 102 surface with a green light with wavelength in a range across 532 nm.

The Applicant has found that the characteristic associated with the refractive power of the transparent sectors 103 of the optical filter according to the present invention such that (i) given the first collimated light 201 incident on the inlet surface 101 along the incidence direction D the transparent sectors 103 focus the first collimated light 201 in proximity to the outlet surface 102, (ii) given the second collimated light 202 incident on the outlet surface 102 along the incidence direction D the transparent sectors 103 focus the second collimated light 202 in proximity to the inlet surface 101, is a characteristic similar to the one guaranteed by the conventional tandem filters. What is different from the conventional tandem filters is that these filters guarantee this optical property for each plane of incidence, but they are affected by the cross talk problem. Otherwise, the optical filter 100 guarantees this characteristic limited to the focusing of the light in the local plane of incidence, but in the absence of cross talk by effect of the presence of the absorbing sectors, which the conventional tandem filters are instead lacking.

In detail, the Applicant has recognized that, in strict analogy to the behaviour of the conventional tandem filters, the present invention refers to a substantially planar optical filter, locally configured to transform a third collimated light 211 (internal or external to an acceptance cone of the filter) and/or a fourth collimated light 212 (internal or external to an acceptance cone of the cone), which are incident respectively on the inlet surface 101 or on the outlet surface 102 along a direction belonging to the local plane of incidence P, in a transmitted or filtered light 130 where (i) for incidence directions inside an acceptance angle of the filter $\vartheta_{acc}$ (indicated in FIG. 1$a$ with 205), measured with respect to the incidence direction D, a transmitted light 130 is characterized by an angular luminance profile in the plane of incidence P of substantially flat-top type, where by substantially flat-top profile is meant a profile characterized by the presence of a high contrast for the outlet angles which vary in a range across a cut angle $\vartheta_{cut}$, or a profile having values close to the maximum value for angles smaller than a cut angle $\vartheta_{cut}$ (indicated in FIG. 1$a$ with 207), the angles being measured with respect to the incidence direction D, and values substantially close to zero elsewhere, said luminance profile being furthermore substantially independent or slightly dependent from the direction of the input collimated light 201,202, 211, 212, and (ii) for incident directions outside the acceptance angle of the filter $\vartheta_{acc}$, the transmitted light 130 is substantially zero.

In the context of the present description and in the appended claims, "cut angle $\vartheta_{cut}$" is intended to indicate the angle such that, by illuminating the optical filter with a diffused light, i.e. a light characterized by an angular profile of substantially constant luminous intensity, the angular profile of luminous intensity of the transmitted light $I(\delta_{out})$ assumes values lower than 15% of its peak value for deviation angles $\delta_{out}$ greater than the cut angle $\vartheta_{cut}$.

In a preferred embodiment, the luminous transmittance $T(\vartheta_{in})$ of the optical filter 100 for the third 211 and fourth 212 collimated light which illuminates the inlet 101 or outlet 102 surface, respectively, propagating along a direction in the plane of incidence P which forms with the incidence direction D an angle $\vartheta_{in}$ such that $|\vartheta_{in}|>A\vartheta_{acc}$ applies $T(\vartheta_{in})<BT_0$, where A=1.3, preferably A=1.2, more preferably A=1.1 and where B=0.20, preferably B=0.15, more preferably B=0.10, even more preferably B=0.05, and where by $T_0$ is meant the average of the luminous transmittance value for angle of incidences smaller than the angle for which the luminous transmittance assumes a value equal to 50% of the peak value, i.e. $T_0 \equiv <T(\vartheta_{in})> |\vartheta_{in}|<\vartheta_{1\text{-}HWHM}$ where $T(\vartheta_{1\text{-}HWHM})=T(0)/2$ In another preferred embodiment, in the case where the optical filter 100 is illuminated with a diffused input light, i.e. with substantially constant luminous intensity in all directions, the luminous intensity $I(\vartheta_{out})$ produced by the optical filter 100 for a transmitted or filtered light 130 and propagating at an angle $\vartheta_{out}>C\vartheta_{cut}$ the relation $I(\vartheta_{out})<D\,I_0$ applies, where C=1.3, preferably C=1.2, more preferably C=1.1 and where D=0.20, preferably D=0.10, more preferably D=0.05, and where by $I_0$ is meant the average of the value of luminous intensity for angles of incidence smaller than the angle for which the luminous intensity assumes a value equal to 50% of the peak value, i.e. $I_0 \equiv <I(\vartheta_{in})>$ for $|\vartheta_{in}|<\vartheta_{2\text{-}HWHM}$ where $I(\vartheta_{2\text{-}HWHM})=T(0)/2$.

In a further embodiment, in the case where the optical filter is illuminated with a diffused input light, i.e. with luminous intensity substantially constant in all directions, the luminous intensity $I(\vartheta_{out})$ produced by the optical filter 100 for a transmitted or filtered light 130 and propagating at an angle $\vartheta_{out}<E\vartheta_{cut}$ the relation $I(\vartheta_{out})>F\,I_0$ applies where E=0.7, preferably E=0.8, more preferably E=0.9 and where F=0.3, preferably F=0.4, more preferably F=0.6, even more preferably F=0.8 and where by $I_0$ is meant the average of the value of luminous intensity for angles of incidence smaller than a positive angle for which the luminous intensity assumes a value equal to 50% of the peak value, i.e. $I_0 \equiv <I(\vartheta_{in})>$ for $|\vartheta_{in}|<\vartheta_{2\text{-}HWHM}$ where $I(\vartheta_{2\text{-}HWHM})=T(0)/2$.

The Applicant has further recognized that the ability of the optical filter according to the present invention to produce a luminance angular profile substantially independent or slightly dependent from the direction of the input collimated light 201,202 turns out to be particularly advantageous in order to produce a direct light luminance angular profile that is substantially spatially uniform even in the presence of an illuminator comprising a plurality of mutually spatially separated LED sources, for example of a plurality of LED sources spatially distributed on a line, which inevitably illuminate the filter with an input collimated light 201,202 whose direction varies from one point to another of the filter, so as not to let the observer glimpse the presence of a plurality of different illuminators, as necessary for producing an image of a single sun infinitely. In particular, the Applicant has recognized that in order to produce an image of a single sun infinitely it is substantially sufficient to illuminate the filter with a spatially uniform illuminance relatively to the light which impinges on it from directions inside the angular acceptance cone of the filter, i.e. directions which forms an angle smaller than the acceptance angle of the filter with respect to the incidence direction.

The Applicant has also identified that the ability of the optical filter according to the present invention to produce a substantially flat-top luminance angular profile, i.e. not of the Gaussian type, such as that produced by a standard illuminator, and at the same time devoid of background, despite the presence of input spurious light, is particularly advantageous in order to produce an image of the sun in sharp contrast with the sky, where the sky appears clear and free of clouds or haze thanks to the absence of background with direct light CCT and where the contours of the image of the sun appear sharp thanks to the high value of luminance in proximity to the cut angle.

In the embodiment of FIG. 1, the absorbing sectors 108 and transparent sectors 103 are parallelepiped-shaped, with the absorbing sectors 108 having a thickness much lower than a thickness d of the transparent sectors, for example a thickness of 3 times, preferably 5 times, even more preferably 10 times smaller than the thickness d of the transparent sectors 103. In particular, the thickness d of the transparent sectors 103 is comprised between 10 μm and 300 μm, preferably between 10 μm and 200 μm, more preferably between 10 μm and 150 μm.

In such an embodiment the absorbing sectors 108 intersect the inlet surface 101 and the outlet surface 102 along substantially straight lines parallel to each other. In other words, a normal N to an absorbing sector 108 of the plurality of absorbing sectors 108 substantially has the same direction N for the entire optical filter 100. In a preferred embodiment, the incidence direction D is inclined with respect to the normal to the inlet 101 and outlet 102 surfaces, for example the incidence direction D forms an angle comprised between 2° and 80°, preferably between 5° and 70°, more preferably between 10° and 60° with respect to the normal to the inlet 101 and outlet 102 surfaces. In another embodiment the incidence direction D is perpendicular to the inlet 101 and outlet 102 surfaces.

An optical filter 100 according to the present invention is readily producible by employing known technologies. By way of non-limiting example, in the first embodiment, in which the absorbing sectors 108 of the plurality of absorbing sectors 108 intersect the inlet surface 101 and the outlet surface 102 along substantially straight lines, the optical filter according to the present invention can be produced in a manner known in the state of the art with a two-step process comprising at least the following two steps:

(i) alternately gluing a plurality of flat sheets or laminates wherein each sheet comprises at least one material transparent to visible light with a plurality of sheets or laminates made with a visible light absorbing material, for example sheets made with polymeric materials such as Silicone, PMMA, PVDF, fluorinated polymers, Polycarbonate, or other polymeric resins, so as to form a multilayer parallelepiped block comprising an alternation of sheets or laminates with at least one transparent material and sheets or laminates made with an absorbing material; and (ii) cutting the multilayer block thus produced according to parallel planes so as to obtain slices delimited by an inlet surface and by an outlet surface and comprising an alternation of transparent sectors and absorbing sectors adjacent to and in contact with each other.

Advantageously, in combination with a lens, a mirror or generally a Fresnel optic of linear type, i.e. characterized by a prismatic structure with the edges oriented along a single direction, which defines a single plane of Fresnel incidence common to the entire Fresnel optic, the optical filter according to the present invention allows to effectively remove the straylight produced by the Fresnel optic in the plane of incidence, without operating any filtering in the plane parallel to the absorbing sectors.

Figures 2, 2A:
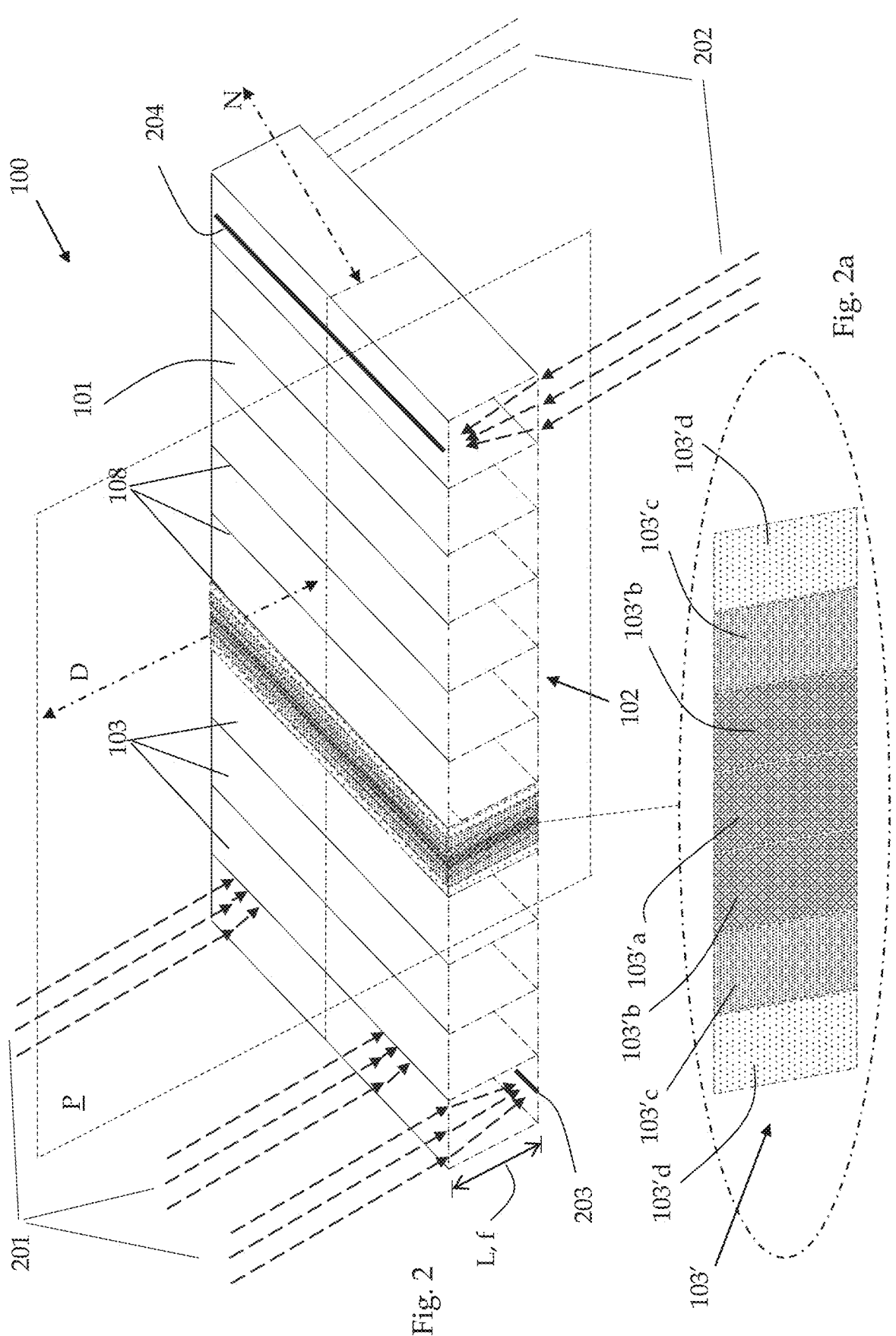
FIGS. 2 and 2a are respectively a schematic perspective view of a second embodiment of an optical filter according to the present invention and an enlarged schematic detail of FIG. 2.

In a preferred embodiment, illustrated by way of nonlimiting example in FIG. 2, each transparent sector 103 of the plurality of transparent sectors comprises a layer of inhomogeneous transparent material characterized by a nonuniform refractive index profile with gradient substantially parallel to the local filtering direction N. In particular, the layer of inhomogeneous material has a minimum value $n_e$ of the refractive index profile at external layers 103'$d$ placed in proximity to the sector walls adjacent to the respective absorbing sectors 108 of the plurality of absorbing sectors 108, and maximum value $n_i$ in a central portion or at an internal sector layer 103'$a$ substantially equidistant from the sector walls, where $n_i$ is the value of the refractive index of the internal layer and $n_e$ is the value of the refractive index of the external layers.

In the context of the present description and in the appended claims, "refractive index of a material" is intended to indicate the real part of the refractive index. This definition finds application both for transparent materials in the visible and for absorbing materials in the visible having a substantially transparent surface layer, with a thickness defined as the penetration length of light, for example a thickness of the order of some wavelengths of the visible light.

More in detail, the layer of inhomogeneous transparent material comprises a plurality of layers 103' of different refractive index. Specifically, the value of the refractive index of each layer 103' of the plurality of layers varies along the local filtering direction N in a discrete manner with dependence from the distance from a central sector portion 103'$a$ which substantially approximates a parabolic function and/or which monotonically decreases from the central portion of the transparent sectors 103 to the sector walls adjacent to the respective absorbing sectors 108. More specifically, the value of the refractive index of each layer 103' of the plurality of layers varies along the local filtering direction N with dependence from the distance from the central sector portion 103'$a$ such as to confer to the transparent sector 103 the refractive power of a convergent lens with focal length f, in which the relation 0.5 L<f<2 L, preferably 0.7 L<f<1.6 L, more preferably 0.7 L<f<1.4 L, even more preferably 0.9 L<f<1.2 L applies. In a further preferred embodiment, the focal distance f is substantially equal to the sector length L.

In a preferred configuration, between the sector length L, the thickness d of the transparent sector 103 and the internal $n_i$ and external $n_e$ refractive indices, the relation applies:

$$L = G \frac{d}{\tan\left(\mathrm{asin}\,\frac{\sqrt{n_i^2 - n_e^2}}{n_i}\right)}$$

where $n_i$ is the value of the refractive index of the internal layer 103'$a$, $n_e$ is the value of the refractive index of the external layers 103'$d$, $d$ is the thickness of the transparent sector 103 and where G<3, preferably G<2, more preferably G<1.5 and/or G>0.3, preferably G>0.5, more preferably G>0.7, applies or in an even more preferred configuration $$G \cong \frac{\pi}{4}$$

applies.

Advantageously, the optical filter 100 thus configured transmits, net of losses due to the reflections on the inlet 101 and outlet 102 surfaces and to the presence of the absorbing sectors 108 that occupy a part of the inlet 101 and outlet 102 surfaces, substantially all or most of a light that fulfils the following requirements:

impinges on the inlet 101 or outlet 102 surface along a direction belonging to the plane of incidence P and forming with the incidence direction D an angle of incidence in air $\delta_{in}$; and for said angle of incidence the relation $\delta_{in} < \theta_{TIR}$ applies, where $\theta_{TIR}$ is the total reflection angle inside the interface between the internal layer 103'$a$ of refractive index $n_i$ and the external layer 103'$d$ of refractive index $n_e$, given by the relation $\theta_{TIR} \equiv \mathrm{a\,sin}(\sqrt{n_i^2 - n_e^2})$.

In essence, therefore, the relation is such that $\theta_{TIR} \cong \theta_{acc}$, that is the total internal reflection angle $\theta_{TIR}$ Substantially coincides with the acceptance angle of the filter $\vartheta_{acc}$.

In other words, in a preferred configuration, between the sector length L, the thickness d of the transparent sector 103, the acceptance angle $\theta_{acc}$ and the internal refractive index $n_i$ the relation applies:

$$L = G \frac{d}{\tan\left(\mathrm{asin}\,\frac{\sin\theta_{acc}}{n_i}\right)}$$

where G<3, preferably G<2, more preferably G<1.5 and/or G>0.3, preferably G>0.5, more preferably G>0.7, applies or in an even more preferred configuration $$G \cong \frac{\pi}{4}$$

applies.

In a preferred configuration of the embodiment of FIG. 2, each transparent sector 103 of the plurality of transparent sectors 103 has a sector length substantially equal to 1.34 mm (L≅1.34 mm), thickness equal to about 0.1 mm (d=0.1 mm), and comprises an inhomogeneous transparent material formed by:

(i) a first layer 103'$a$ positioned in the central portion of the sector having thickness 0.0384 mm and refractive index equal to 1.4924 (PMMA);

(ii) a pair of second layers 103'$b$ alongside the first layer each having thickness 0.016 mm and refractive index equal to 1.4916;

(iii) a pair of third layers 103'$c$ alongside the second layers and each having thickness 0.0103 mm and refractive index 1.4907; and (iv) a pair of fourth layers 103'*d* alongside the third layers and each having thickness 0.0045 mm and refractive index 1.4898.

Advantageously, an optical filter thus configured produces an angular profile of luminous intensity characterized by a cut angle of about 5°.

In a different preferred configuration of the embodiment of FIG. 2, each transparent sector 103 of the plurality of transparent sectors 103 has a sector length substantially equal to 1.27 mm (L≅1.27 mm), thickness equal to about 0.1 mm (d=0.1 mm), and comprises an inhomogeneous transparent material formed by:

(v) a first layer 103'*a* positioned in the central portion of the sector having thickness 0.0385 mm and refractive index equal to 1.416 (Silicone);

(vi) a pair of second layers 103'*b* alongside the first layer each having thickness 0.0159 mm and refractive index 1.4151;

(vii) a pair of third layers 103'*c* alongside the second layers and each having thickness 0.0104 mm and refractive index 1.4142; and (viii) a pair of fourth layers 103'*d* alongside the third layers and each having thickness 0.0044 mm and refractive index 1.4133.

Advantageously, even an optical filter so configured produces an angular profile of luminous intensity characterized by a cut angle of about 5°.

In a preferred embodiment according to the invention (not illustrated), each transparent sector 103 of the plurality of transparent sectors comprises a layer of inhomogeneous transparent material which in turn comprises a first layer 103'*a* positioned in the central portion of the sector and having an internal refractive index $n_i$ and a single pair of second layers 103'*b*, each alongside the first layer 103'*a* and having a minimum or external refractive index $n_e$. In a particular embodiment, the second layers 103'*b* alongside the first layer 103'*a* and having a minimum refractive index $n_e$ are respectively a surface layer of a pair of absorbing sectors 108 in which the light penetrates without being substantially absorbed, wherein each absorbing sector 108 borders one side of the first layer 103'*a* and wherein the pair of absorbing sectors 108 is made with a material having the minimum refractive index $n_e$. In particular, the surface layer of the absorbing sector 108 in which the light penetrates without being substantially absorbed is a layer of thickness comprised between 0.5 and 250 µm, preferably between 0.5 and 100 µm, more preferably between 0.5 and 50 µm.

Figure 1A:
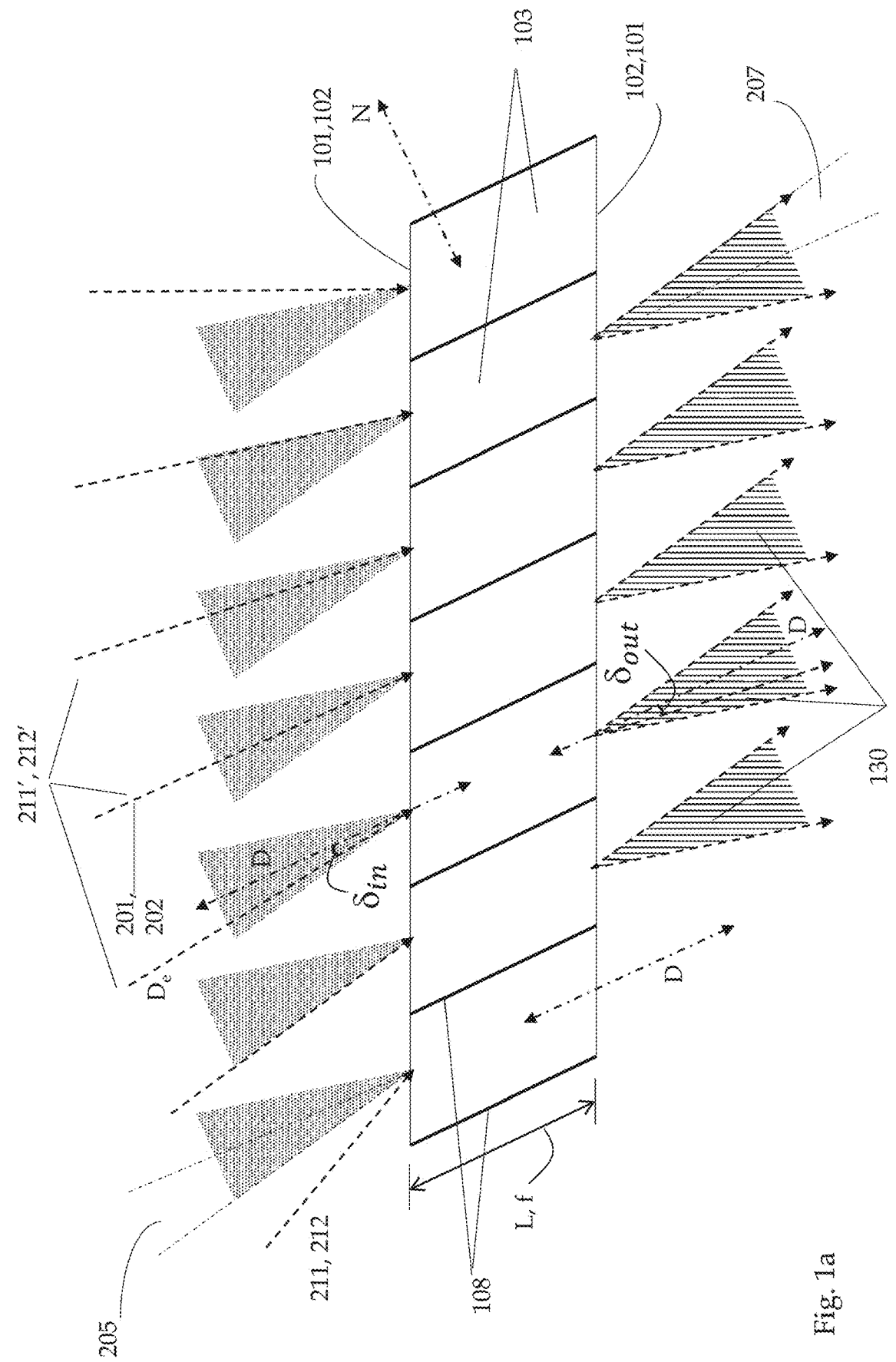
FIG. 1a is a schematic side elevational view of the optical filter of FIG. 1.

Advantageously, if on the inlet surface 101 a third collimated light 211' inside the acceptance cone impinges (indicated in FIG. 1*a* with 205), or for the sake of brevity third internal collimated light 211', i.e. a third collimated light which impinges along an inlet direction $D_e$ comprised in the plane of incidence P and deviated with respect to the incidence direction D by an angle of incidence $\delta_{in}$, the plurality of transparent sectors 103 made with an inhomogeneous material with the first central layer 103'*a* and the one single pair of second layers 103'*b* alongside the first layer 103'*a* as described above produces at least one component of transmitted light that exits from the outlet surface 102 along a direction comprised in the plane of incidence P and deviated with respect to the incidence direction D by a deviation angle $\delta_{out}$ such that $$\frac{\delta_{in}}{|\delta_{in}|} = -\frac{\delta_{out}}{|\delta_{out}|}$$

and where the luminous transmittance for the third internal collimated light 211' is equal to about 60% net of losses due to reflections on the inlet 101 and outlet 102 surfaces. Advantageously, in such an embodiment a similar behaviour is found for a fourth collimated light 212' inside the acceptance cone 205 which impinges on the outlet surface 102, which exits the inlet surface 101 with a luminous transmittance equal to about 60% net of losses due to reflections on the inlet 101 and outlet 102 surfaces.

In a preferred configuration, between the sector length L, the thickness d of the transparent sector 103 and the internal $n_i$ and external $n_e$ refractive indices, the relation applies:

$$L = G \frac{d}{\tan\left(a\sin\frac{\sqrt{n_i^2 - n_e^2}}{n_i}\right)}$$

where $n_i$ is the value of the refractive index of the internal layer, $n_e$ is the value of the refractive index of the external layer, d is the thickness of the transparent sector 103 and where G<3, preferably G<2, more preferably G<1.5 and/or G>0.3, preferably G>0.5, more preferably G>0.7, applies or in an even more preferred configuration G≅1 applies.

Advantageously, the optical filter 100 thus configured transmits, net of losses due to the reflections on the inlet 101 and outlet 102 surfaces and to the presence of the absorbing sectors 108 that occupy a part of the inlet 101 and outlet 102 surfaces, substantially all or most of a light that fulfils the following requirements:

impinges on the inlet 101 or outlet 102 surface along a direction belonging to the plane of incidence P and forming with the incidence direction D an angle of incidence in air $\delta_{in}$; and for said angle of incidence the relation $\delta_{in} < \theta_{TIR}$ applies, where $\theta_{TIR}$ is the total reflection angle inside the interface between the internal layer 103'*a* of refractive index $n_i$ and the external layer 103'*b* of refractive index $n_e$, given by the relation $\theta_{TIR} \equiv a\ \sin(\sqrt{n_i^2 - n_e^2})$.

The condition G≅1, i.e. when G is substantially equal to 1, corresponds to the case where the sector length L is such as to produce a geometric cut angle $\theta_{geo} = \theta_{TIR}$, with the geometric cut angle $\theta_{geo}$ equal to the maximum angle whereby, in the absence of refractive power of the channel, a beam of light could pass through the transparent sector 103 without interacting with the adjacent absorbing sectors 108. The condition G≅1 therefore corresponds to the case that guarantees, for $\delta_{in} < \theta_{TIR}$, the maximum transmission efficiency, given that the incident light is reflected at the interface between the layers and therefore not absorbed, with the minimum sector length, and therefore with the minimum cost for the device.

Figures 3, 3A:
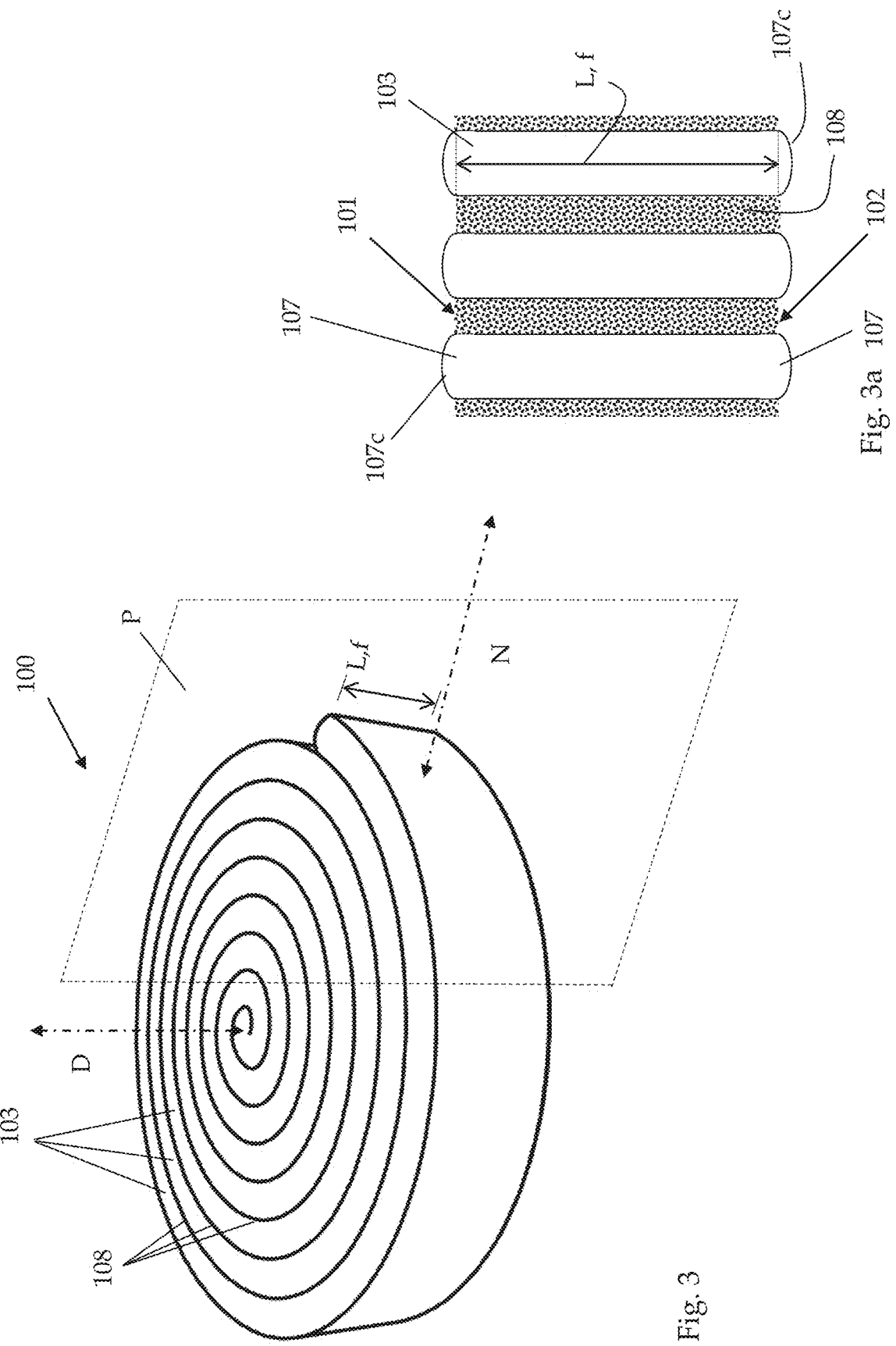
FIGS. 3 and 3a are respectively a schematic perspective view of a third embodiment of an optical filter according to the present invention and a sectioned portion thereof.
Figures 8, 8A:
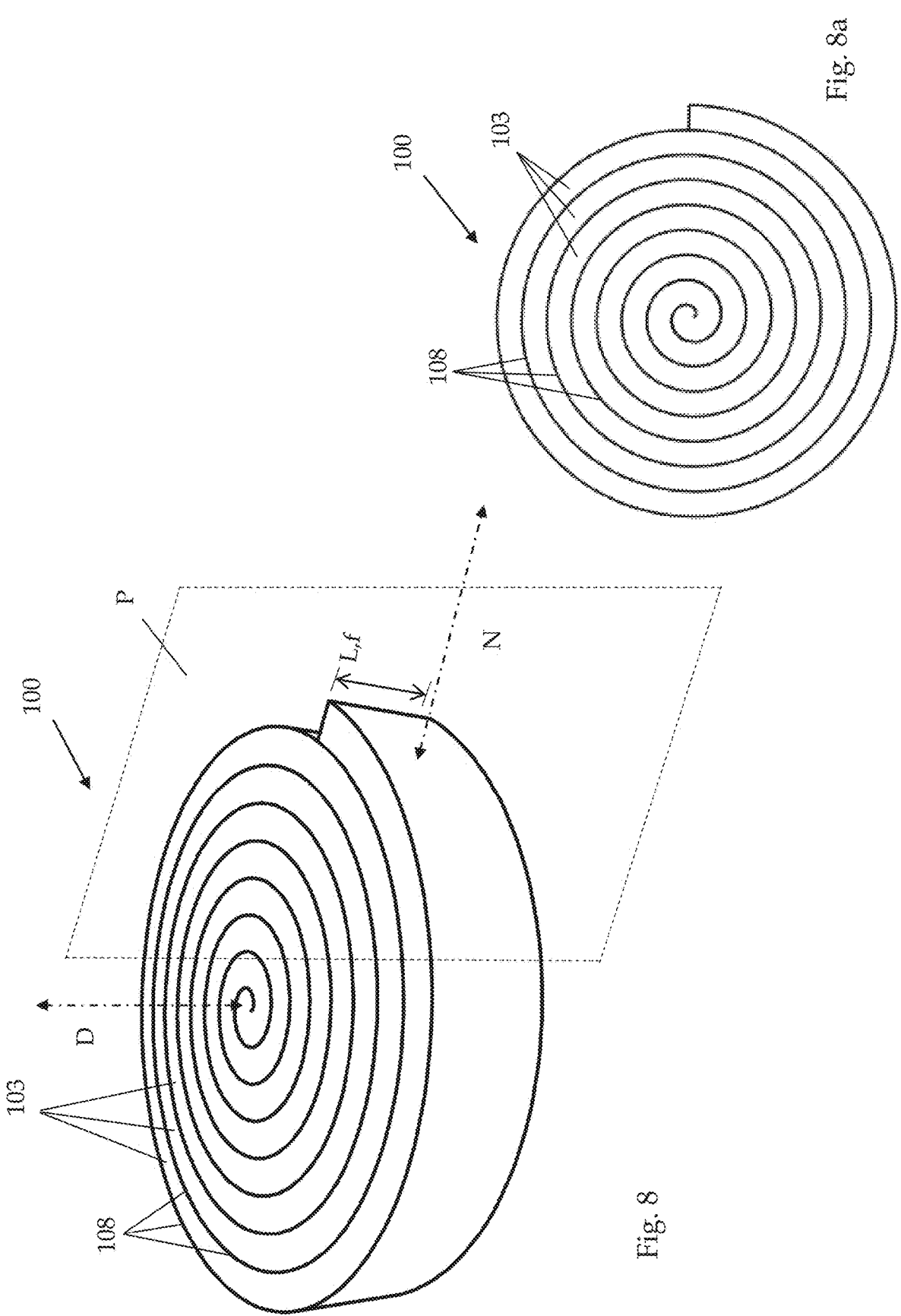
FIGS. 8 and 8a are respectively a schematic perspective view of a different embodiment of an optical filter according to the present invention and a plan view thereof.

FIGS. 3 and 8 show two different embodiments which differ from the embodiment of FIG. 1 due to the fact that the absorbing 108 and transparent 103 sectors are spirally shaped, respectively defining a plurality of spiral absorbing 108 sectors and of spiral transparent 103 sectors. In these embodiments the set of the spiral absorbing sectors 108 intersect the inlet surface 101 and the outlet surface 102 along a spiral line. Preferably, the surface of at least a subset of the spiral absorbing sectors 108 has a radius of curvature at least 5 times, preferably at least 10 times, more preferably at least 30 times greater than the distance between pairs of adjacent absorbing sectors 108.

By way of non-limiting example, the optical filter according to the embodiment in which the absorbing sectors 108 intersect the inlet surface 101 and the outlet surface 102 along a spiral line, can be produced with a three-step process comprising at least the following three steps:

(i) gluing at least one sheet or laminate comprising at least one material transparent to visible light with at least one sheet or laminate made with a visible light absorbing material, for example both sheets or laminates being for example made with polymeric materials such as Silicone, PMMA, PVDF, fluorinated polymers, Polycarbonate, or other polymeric resins, so as to obtain a laminated sheet comprising at least one double layer of transparent and absorbing material (ii) rolling the laminated sheet on itself or on a cylindrical support so as to form a multilayer cylindrical block, for example a multilayer cylindrical block with spiral structure; and (iii) cutting the multilayer cylindrical block thus produced according to planes parallel and orthogonal to the axis of the cylinder so as to obtain slices delimited by an inlet surface and by an outlet surface and comprising an alternation of transparent sectors and absorbing sectors adjacent to and in contact with each other.

Advantageously, the optical filter according to the present invention where the composite absorbing sectors 108 intersect the inlet surface 101 and the outlet surface 102 along concentric circles or along a spiral line is able to efficiently remove the spurious light generated by a conventional radial Fresnel lens, i.e. with rotationally invariant structure with respect to the optical axis. For this purpose it is sufficient to arrange the Fresnel lens with the optical axis parallel to the incidence direction of the optical filter and passing through the centre of the concentric circles or of the spiral line. In this way the local filtering directions are rays emerging from the optical axis of the Fresnel lens and lie in the plane of the inlet or outlet surface of the filter. With the exception of the region of the filter close to the centre of the spiral, the absorbing sectors substantially conform to the external surfaces of concentric cylinders centred on the optical axis, and the local planes of incidence of the filter, i.e. the planes containing the directions for which the filter performs the absorbing action, are at each point the planes containing the point in question and the optical axis of the lens, i.e. the planes containing the directions where the straylight assumes the maximum value. For this reason, the optical filter 100 is able to effectively remove the straylight of a radial Fresnel lens, without the need to use a two-dimensional multi-channel spatial filter with absorbing channels.

Advantageously, in combination with a lens, or generally a radial-type Fresnel optic or collimator, the optical filter according to the present invention where the absorbing sectors 108 intersect the inlet surface 101 and the outlet surface 102 along concentric circles or along a spiral line allows to produce the image in the eye of a circular sun as shown in FIGS. 5a and 5b in logarithmic scale and in arbitrary units, even starting from a source, for example a square, rectangular LED or any other form source.

In the presence of a square LED source arranged in the focus of a radial Fresnel lens and in the absence of the optical filter according to the present invention, said Fresnel lens produces at each point an angular luminance profile projecting in the far field, and therefore in the focus of the lens of the eye, the square LED image added to the image produced by the straylight as shown in FIGS. 4a and 4b in logarithmic scale and in arbitrary units. By coupling such a Fresnel lens with an optical filter according to the present invention, it is obtained that the angular luminance profile locally produced at each point by the filter is rectangular, since the refractive action of the filter operates at each point only in the local plane of incidence. The Applicant has however surprisingly noted that the overall angular luminance profile produced by the optical filter 100 according to the invention, i.e. the profile given to the sum of all the contributions of the light emerging from the filter 100, is perfectly circular. This is due to the rotationally invariant symmetry with respect to the introduced optical axis of the filter 100. Therefore, an observer positioned such that the image of the source perceived by him is subtended by the entire opening of the filter 100, or a plurality of filter openings 100, as normally happens for small-sized collimators coupled to individual LEDs, perceives the source as perfectly circular, as well as devoid of any straylight. The optical filter 100 according to the present invention therefore allows to obtain the image of a perfectly round sun, without making use of any circular mask that performs a cut or subtracts light either on the object or in any image plane, but simply adding contributions at different angles according to the correct symmetry.

Advantageously, the described solution makes the use of low-angle white light diffusers, or "frost" diffusers, superfluous, which are indeed able to produce a circular image, but greatly blurring the image of the sun, so as to produce an image like the one perceived in nature in the presence of clouds or haze.

In the embodiment of FIGS. 3 and 3a, each transparent sector 103 of the plurality of transparent sectors comprises at least one solid transparent material having a first refractive index n and an interface surface 107c which extends between two absorbing sectors 108 in proximity to the inlet surface 101 and the outlet surface 102. As illustrated in detail in FIG. 4a, the interface surface 107c is rounded and is subtended by a refractive element 107. In particular, the interface surface 107c is locally conforming to the external surface of a cylinder having the axis of the cylinder orthogonal to the local plane of incidence P, convexity facing inwards and characterized by a radius of curvature (ROC).

Figure 7:
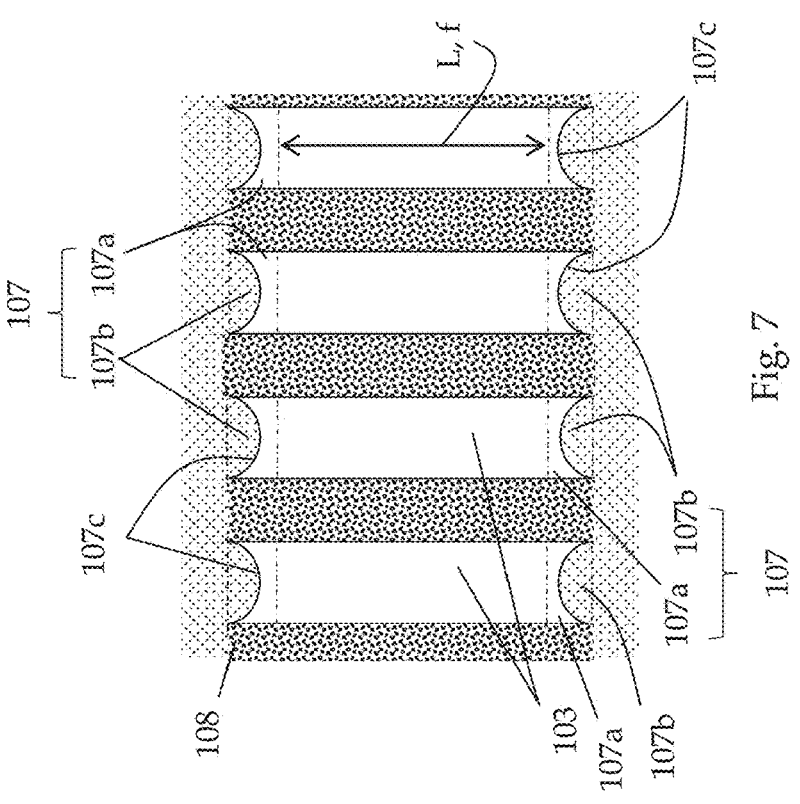
FIGS. 6 and 7 are sectioned portions of respective optical filters according to further embodiments of the present invention.
Figure 6:
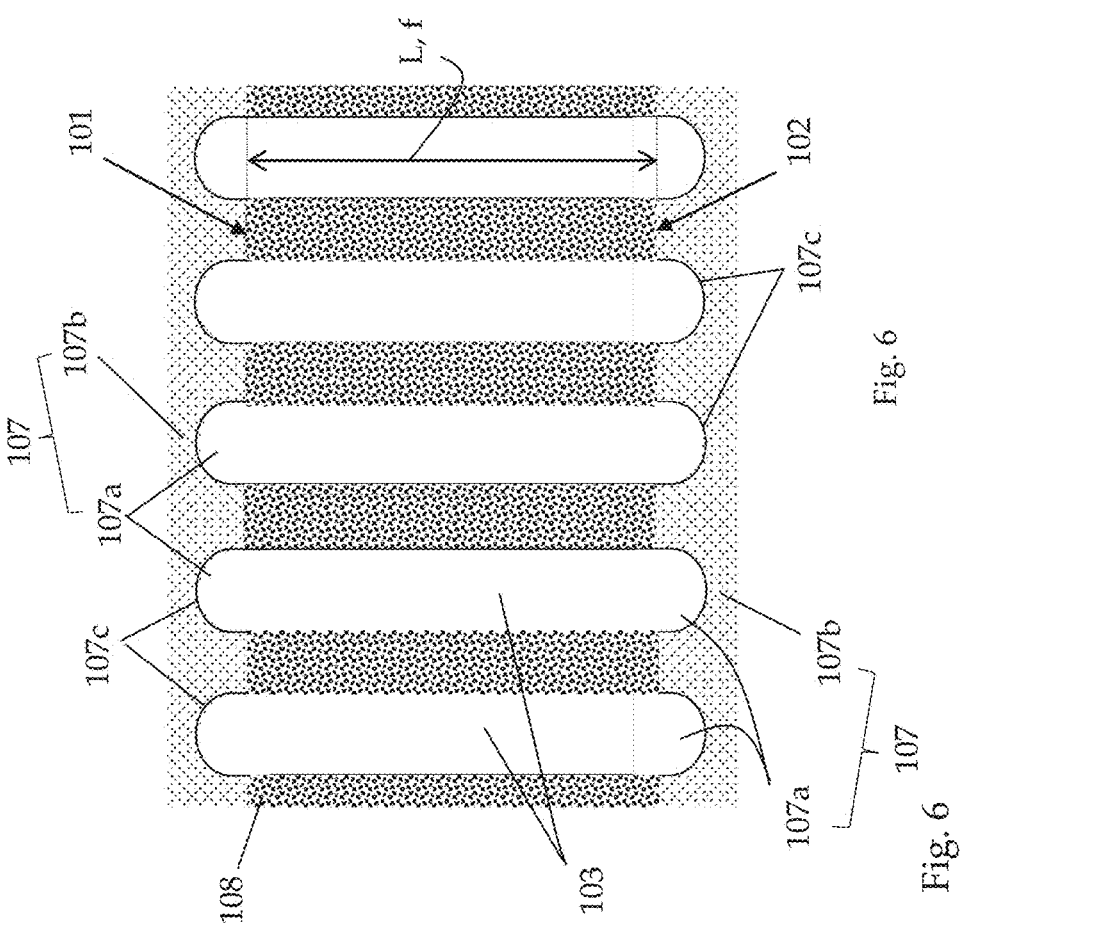

FIGS. 6 and 7 illustrate two sections in the local plane of incidence P of the optical filter 100 according to the present invention. FIGS. 6 and 7 refer to further embodiments in which the transparent sectors 103 may be parallelepiped-shaped or have another three-dimensional shape in accordance with the present invention. In the embodiments of FIGS. 6 and 7 each transparent sector 103 of the plurality of transparent sectors is coupled with at least one external refractive element 107b through the interface surface 107c. The external refractive element 107b has an external surface, opposite to the interface surface 107c, substantially flat and parallel to the inlet surface 101 or, respectively, to the outlet surface 102. The external refractive element 107b is made with a transparent material having a second refractive index $n_2$. This second refractive index $n_2$ is smaller than the first refractive index n ($n_2 < n$) when the interface surface 107c has convexity facing the outside of the transparent sector, as illustrated in FIG. 6, and is greater than the first refractive index n ($n_2 > n$) when the interface surface 107c has convexity facing inwards the transparent sector, as illustrated in FIG. 7.

In the configurations illustrated in FIGS. 6 and 7, each transparent sector 103 of the plurality of transparent sectors comprises an internal refractive element 107a subtended by the interface surface 107c made with a transparent material having a third refractive index $n_3$ different from or equal to the first refractive index n, i.e. $n_3 \neq n$ or $n_3 = n$. In particular, the external refractive element 107*b* forms with an internal refractive element 107*a* subtended by the interface surface 107*c* a doublet 107 having an optical power of a converging cylindrical lens. In a preferred configuration, the values of the first n, of the second $n_2$ and of the third $n_3$ refractive indexes, as well as the value of the radius of curvature ROC of the interface surface 107*c* are such as to locally confer to said interface surface 107*c* an optical power of a converging cylindrical lens having axis of the cylinder orthogonal to the local plane of incidence P and focal length f in a medium having a first refractive index n in which the relation 0.5 L<f<2 L, preferably 0.7 L<f<1.6 L, more preferably 0.7 L<f<1.4 L, even more preferably 0.9 L<f<1.2 L applies, or further preferably, wherein the focal length f is substantially equal to the sector length L.

Advantageously, the solutions illustrated in FIGS. 3, 3*a*, 6 and 7, where each transparent sector 103 comprises at least a pair of curved interface surfaces 107*c* in contact with the air or with an external refractive element 107*b*, guarantee a value of the transmission coefficient of the incident luminous flow within the acceptance angle and coupled to the plurality of the transparent sectors that is significantly greater than 50%, and for example greater than 60%, preferably 70%, even more preferably 80%, or even greater than 90%, said value being greater the more the focal distance f is close to the sector length L, the theoretical limit being in the case of f=L equal to 100%.

Further advantageously, the use of an external refractive element 107*b* allows to be able to choose between a wide variety of values for the radius of curvature ROC of the interface surface 107*c*, with the same focal length f, so as to be able to select the most suitable surface production method among different methods such as ink-jet printing, and/or chemical erosion and/or mechanical erosion and/or erosion by plasma treatment depending on the materials, the dimensions and the geometries chosen for the filter.

In a preferred configuration of the optical filter according to FIG. 7, each transparent sector of the plurality of transparent sectors has sector length L=0.8 mm, thickness d=0.1 mm measured along a direction normal to the absorbing sector, and consists of a homogeneous transparent material with refractive index n=1.414 (SILICONE). The interface surface 107*c* has convexity facing inwards the transparent sector 103 and is characterized by a value of the radius of curvature ROC substantially equal to 0.068 mm. The external refractive element 107*b* is made with a transparent material having a second refractive index $n_2$=1.429 (PMMA). In this way the doublet 107 produces in the medium of refractive index n a focal f of the desired value substantially equal to the length of the sector L=0.8 mm, and guarantees a value of the acceptance angle $\vartheta_{acc}$ and of the cut angle $\vartheta_{cut}$ given by $\vartheta_{cut} \sim \vartheta_{acc} \cong 5°$. The plurality of external refractive elements 107*b* constitutes a rigid monoblock with a flat external surface and incorporating plurality of interface surfaces 107*c*.

Unlike the embodiments of FIGS. 3, 3*a*, 6 and 7, but in analogy to the embodiment of FIGS. 2 and 2*a*, in the embodiment of FIG. 8 each transparent sector 103 of the plurality of transparent sectors comprises a layer of inhomogeneous transparent material characterized by a non-uniform refractive index profile with gradient substantially parallel to the local filtering direction N. The layer of inhomogeneous material has a minimum value of the refractive index profile in proximity to the walls of the transparent sector 103 adjacent to the respective absorbing sectors 108 and a maximum value in a central portion of the transparent sector 103. In particular, the layer of inhomogeneous transparent material comprises a plurality of layers of different refractive index. In detail, the values of the refractive indices of the plurality of layers vary along the local filtering direction N in a discrete manner, with dependence which substantially approximates a parabolic function and/or which decreases monotonically from the central portion of the transparent sectors 103 to the sector walls adjacent to the respective absorbing sectors 108. Alternatively, the values of the refractive indices of the plurality of layers vary along the local filtering direction N in a discrete manner, with a dependence such as to confer to the transparent sector 103 the refractive power of a lens with focal length f, wherein the relation 0.5 L<f<2 L, preferably 0.7 L<f<1.6 L, more preferably 0.7 L<f<1.4 L, even more preferably 0.9 L<f<1.2 L applies. In a further preferred embodiment, the focal length f is substantially equal to the sector length L.

Figure 9:
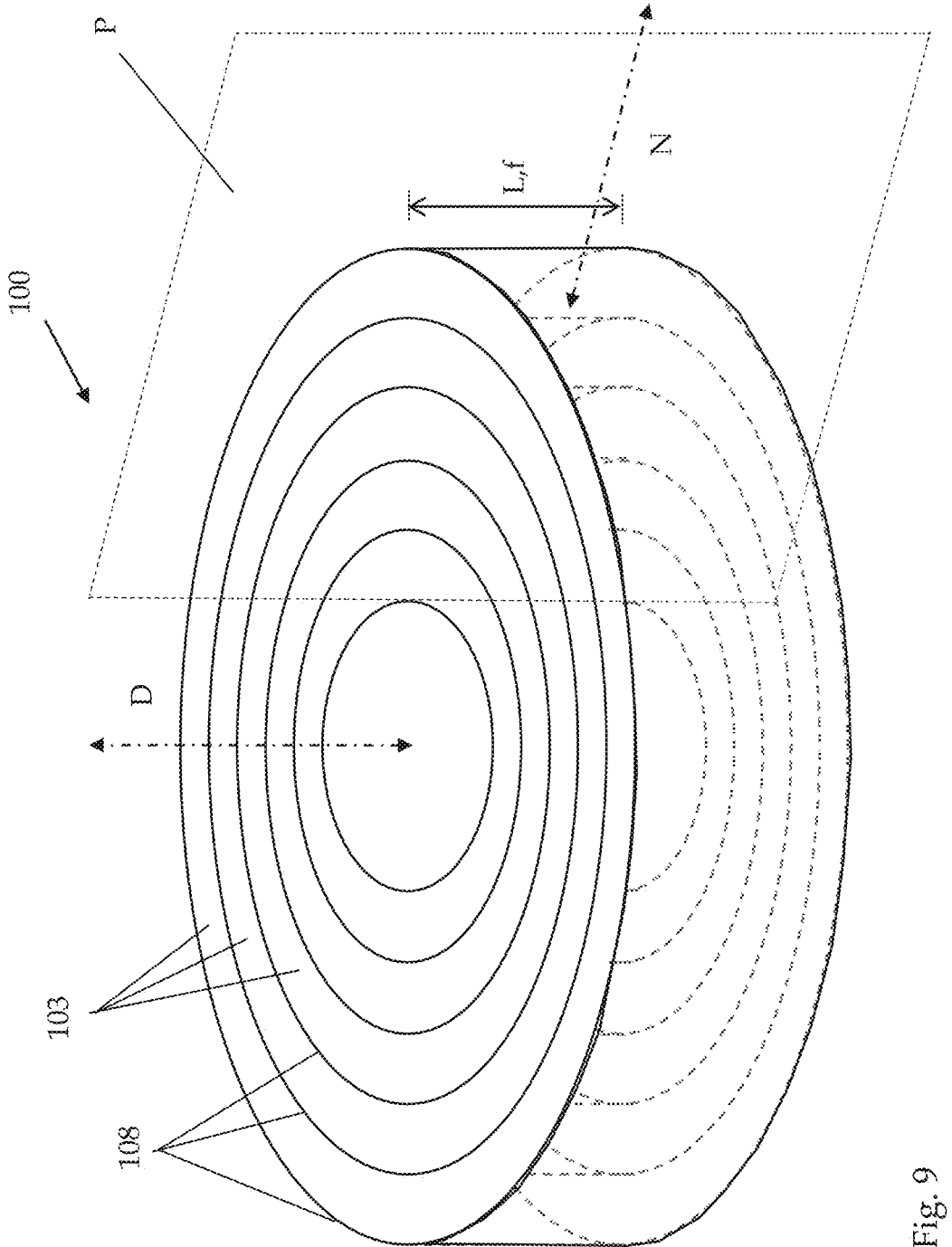
FIG. 9 is a schematic perspective view of another embodiment of an optical filter according to the present invention.

FIG. 9 shows a further embodiment which differs from the embodiment of FIG. 1 in that the absorbing 108 and transparent 103 sectors are formed with concentric rings. In this embodiment the absorbing sectors 108 intersect the inlet surface 101 and the outlet surface 102 along concentric circles. Also in this case, like with the spiral embodiments, each absorbing sector 108 of the plurality of absorbing sectors 108 has a radius of curvature at least 5 times, preferably at least 10 times, more preferably at least 30 times greater than the distance between pairs of adjacent absorbing sectors 108.

In analogy to the embodiment of FIGS. 2 and 2*a*, in the embodiment of FIG. 9 each transparent sector 103 of the plurality of transparent sectors comprises a layer of inhomogeneous transparent material characterized by a non-uniform refractive index profile with gradient substantially parallel to the local filtering direction N. The layer of inhomogeneous material has a minimum value $n_e$ of the refractive index profile in proximity to the walls of the transparent sector 103 adjacent to the respective absorbing sectors 108 and maximum value $n_i$ in a central portion of the transparent sector 103, where $n_i$ is the value of the refractive index of the innermost or central portion of the transparent sector 103 and $n_e$ is the value of the refractive index of the outermost portions of the transparent sector 103.

In this case, the refractive index profile of each transparent sector 103 varies continuously according to a substantially parabolic and/or monotonically decreasing trend from the central portion of the transparent sectors 103 to the sector walls adjacent to the respective absorbing sectors 108. Alternatively, the refractive index profile of each transparent sector 103 varies continuously according to a trend such as to locally confer to the transparent sector 103 a refractive power of a GRIN cylindrical lens with focal length f, in which the relation 0.5 L<f<2 L, preferably 0.7 L<f<1.6 L, more preferably 0.7 L<f<1.4 L, even more preferably 0.9 L<f<1.2 L applies. In a further preferred embodiment, the focal length f is substantially equal to the sector length L.

Also in this case, in a preferred configuration, between the sector length L, the thickness d of the transparent sector 103 and the internal $n_i$ and external $n_e$ refractive indices the relation applies:

$$L = G \frac{d}{\tan\left(a\sin\frac{\sqrt{n_i^2 - n_e^2}}{n_i}\right)}$$

where $n_i$ is the value of the refractive index at the innermost portion of the layer, $n_e$ is the value of the refractive index at the outermost portion of the layer, d is the thickness of the transparent sector 103 and where G<3, preferably G<2, more preferably G<1.5 and/or G>0.3 applies, preferably G>0.5, more preferably G>0.7, applies or in an even more preferred configuration $$G \cong \frac{\pi}{4}$$

applies.

Advantageously, also in this case, the optical filter 100 thus configured transmits, net of losses due to the reflections on the inlet 101 and outlet 102 surfaces and the presence of the absorbing sectors 108 that occupy a part of the inlet 101 and outlet 102 surfaces, substantially all or most of a light that fulfils the following requirements:

impinges on the inlet 101 or outlet 102 surface along a direction belonging to the plane of incidence P and forming with the incidence direction D an angle of incidence in air $\delta_{in}$; and for said angle of incidence the relation $\delta_{in} < \theta_{TIR}$ applies, where $\theta_{TIR}$ is the total reflection angle inside the interface between the internal layer 103'$a$ of refractive index $n_i$ and the external layer 103'$b$ of refractive index $n_e$, given by the relation $\theta_{TIR} = a \sin(\sqrt{n_i^2 - n_e^2})$ In essence, also in this case, the relation such that $\theta_{TIR} \cong \theta_{acc}$ applies, that is the total internal reflection angle $\theta_{TIR}$ substantially coincides with the acceptance angle of the filter $\vartheta_{acc}$.

In other words, in a preferred configuration, between the sector length L, the thickness d of the transparent sector 103, the acceptance angle $\theta_{acc}$ and the internal refractive index $n_i$ the relation applies:

$$L = G \frac{d}{\tan\left(a\sin\frac{\sin\theta_{acc}}{n_i}\right)}$$

where G<3, preferably G<2, more preferably G<1.5 and/or G>0.3, preferably G>0.5, more preferably G>0.7, applies or in an even more preferred configuration $$G \cong \frac{\pi}{4}$$

applies.

In a preferred embodiment, with reference for example to the cases of FIG. 8 and FIG. 9, each transparent sector of the plurality of transparent sectors has sector length L=1.1 mm, thickness d=0.1 mm measured along the local filtering direction N, and consists of a material with an inhomogeneous refractive index that varies continuously along the local filtering direction N, or of a plurality of layers of different materials with different refractive indices where the refractive index for a layer at the centre of the transparent sector is $n_0$=1.412 (Silicone), while the refractive index for a general position at a distance r from the centre is approximately described by the law $n = n_0 - Ar^2$, with A=1,471 $mm^{-2}$ and with r expressed in mm, the distance from the centre of the transparent sector being measured along the local filtering direction N, thus obtaining a value of the refractive index to the surfaces of the transparent sector 103 in contact with the absorbing sectors 108 equal to n=1,408. The Applicant has observed that in such an optical filter, each transparent sector behaves like a GRIN lens with a continuous or discrete index profile and characterized by a focal length in the medium with refractive index at the centre of the sector equal to n=$n_0$ with a value substantially equal to the length of the sector (f≅L), as well as by a value in air of the acceptance angle $\vartheta_{acc}$ and of the cut angle $\vartheta_{cut}$ given by $\vartheta_{cut} - \vartheta_{acc} \cong 6°$.

Advantageously, the solution where the refractive power of the transparent sector does not result from the presence of a curved interface surface but from the use of an inhomogeneous material or of a plurality of layers of different materials brings about a considerable simplification of the production process. In fact, it does not require the manufacture of curved interface surfaces but is limited to performing the cutting into slices of parallelepiped or cylindrical blocks made with sheets or laminates in turn made, according to known art, in such a way that they exhibit a continuously variable or discrete refractive index along a direction orthogonal to the extended surface of the slice. This allows the filter to be obtained simply by slicing the block according to the cutting plane and the desired thickness, and possibly incorporating the slice thus obtained between two layers of transparent material with flat and parallel faces to obtain the best mechanical support from the filter.

Clearly, each transparent sector 103 of the plurality of transparent sectors may comprise at least one layer of inhomogeneous transparent material characterized by a non-uniform refractive index profile that varies in a discrete manner or continuously, or a substantially homogeneous material having a first constant refractive index n, but conformed in such a way as to confer to the interface surface 107$c$ of the transparent sector an optical power of a converging cylindrical lens, regardless of its conformation whether it is parallelepiped, concentric ring or spiral.

Figure 10:
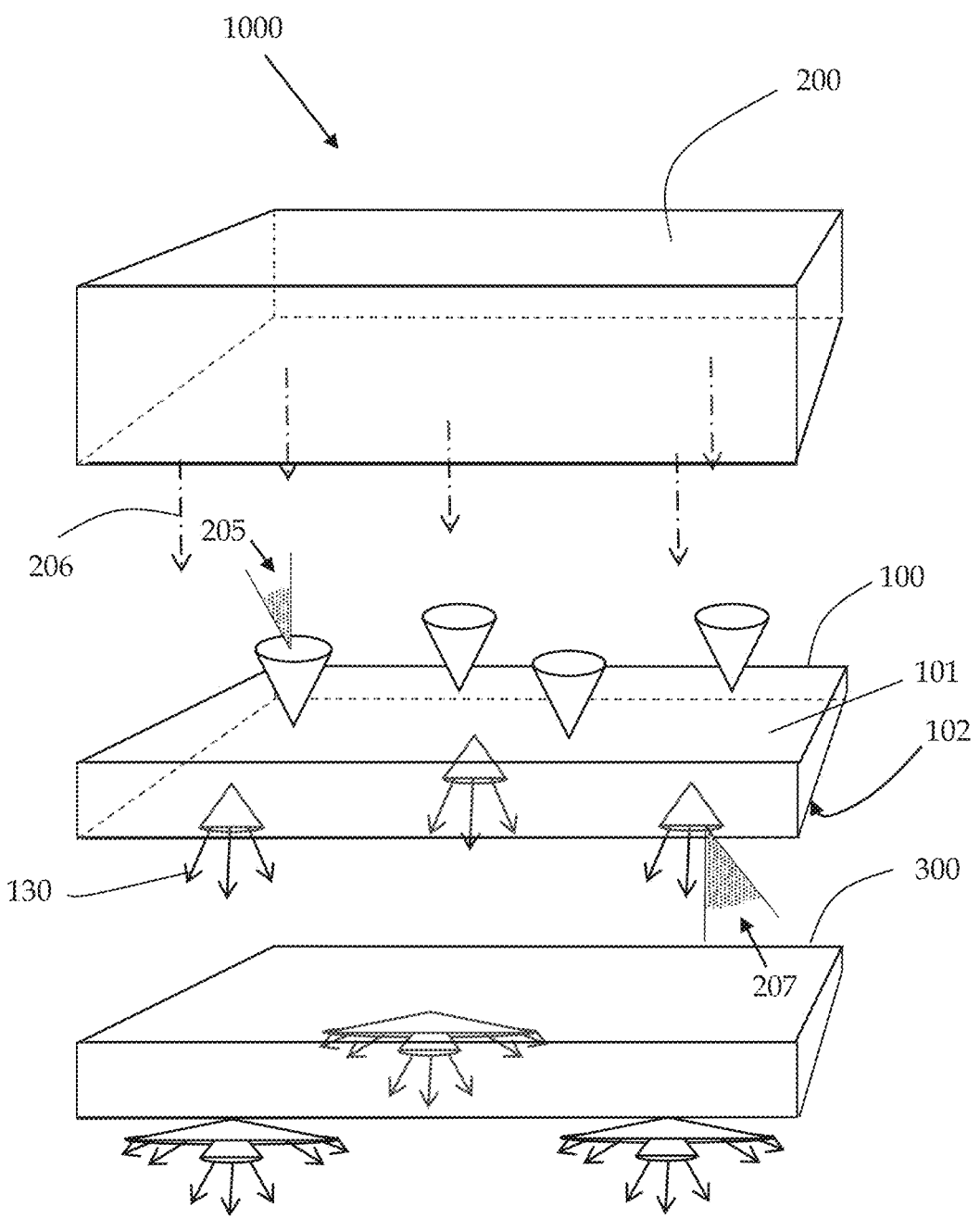
FIG. 10 is a schematic perspective view of an illumination device for reproducing the light of the sky and the sun according to the present invention.

Referring to FIG. 10 there is illustrated an example of an artificial light illumination device 1000 for reproducing sunlight employing an optical filter 100 according to the present invention. The artificial light illumination device 1000 comprises a direct light source 200 configured to emit visible light in a non-isotropical manner, preferably along directions in a range across a main direction 206, having a first colour correlated temperature or CCT. In some embodiments according to the invention, the direct light source 200 is configured to emit visible light having a fixed CCT, e.g., a CCT greater than 5000 degrees Kelvin. In other embodiments according to the invention, the direct light source 200 is configured to emit visible light having a variable CCT, for example a variable CCT in the range 1700-8000 degrees Kelvin.

Downstream of the direct light source 200 with respect to the main direction 206 there is placed an optical filter 100 according to the invention.

The artificial light illumination device 1000 further comprises a diffused light source 300 positioned downstream of the optical filter 100 with respect to the main direction 206. The diffused light source 300 is configured to transmit, at least in part, the filtered light in output from the filter 100. Specifically, the diffused light source is configured to produce a diffused light component and a transmitted light component with angular luminance profile similar to the angular luminance profile of the light filtered by the optical filter 100, i.e. characterized by a similar value for the cut angle $\vartheta_{cut}$.

In some embodiments of the invention, the diffused light source 300 is configured to produce a light having a direct component having a colour correlated temperature or CCT less than at least 20% of the colour correlated temperature or CCT of the light produced by the direct light source 200. For example, the diffused light source 300 is a Rayleigh diffuser.

In other embodiments of the invention, the diffused light source 300 is configured to produce a light having a direct component having a CCT substantially identical to the CCT of the light produced by the direct light source 200. For example, the diffused light source 300 is a "side-lit" diffuser panel, i.e. lit laterally by a source other than the direct light source.

In some embodiments of the invention, the diffused light source 300 is further configured to produce a diffused light component, characterized by an angular luminance profile characterized by a divergence at least 2 times, preferably 3 times, more preferably 4 times greater than the divergence of the direct component, and/or by a correlated colour temperature or CCT at least 1.2 times, preferably 1.3 times, more preferably 1.5 times, even more preferably 1.8 times greater than the first CCT, and/or a CCT equal to 5600 Kelvin.

In a first preferred embodiment, the direct light source 200 comprises at least one LED source collimated by a radial type collimator, i.e. having invariant structure by rotation with respect to its optical axis, such as for example a radial Fresnel collimator. Preferably, the optical filter 100 is oriented with respect to the direct light source 200 so as to have the inlet surface 101 substantially orthogonal to the main direction 206. Preferably the optical filter 100 has the absorbing sectors 108 intersecting the inlet surface 101 and the outlet surface 102 along concentric circles or along a spiral line.

In a second preferred embodiment, the direct light source 200 comprises at least a plurality of LED sources arranged along a line of sources, for example arranged so as to form a linear type illuminator. Preferably, the optical filter 100 is oriented with respect to the direct light source 200 so as to have the inlet surface 101 substantially orthogonal to the main direction 206. Alternatively, the optical filter 100 is oriented with respect to the direct light source 200 so as to have the inlet surface 101 inclined with respect to the main direction 206, for example inclined by an angle comprised between 0° and 80°, preferably between 10° and 70°, more preferably between 20° and 60°. Preferably the optical filter 100 is configured so as to have the absorbing sectors 108 intersecting the inlet surface 101 and the outlet surface 102 arranged along straight lines parallel to each other and orthogonal to the source line.

In a third preferred embodiment, the illumination device 1000 comprises a plurality of LED sources substantially arranged on a source plane and a refractor or a linear type Fresnel reflector configured to deflect the direction of the light incident thereon along directions comprised within a Fresnel plane of incidence orthogonal to the source plane. Preferably the illumination device 1000 is configured to produce downstream of the diffused light source 300 a direct light component that propagates along a direction substantially different from a normal to the plane of sources. Preferably the optical filter 100 is configured so as to have the absorbing sectors 108 intersecting the inlet surface 101 and the outlet surface 102 along straight lines parallel and orthogonal to the Fresnel plane of incidence. Preferably the optical filter 100 is positioned so as to have the inlet 101 and outlet 102 surfaces substantially parallel to the source plane.

The invention claimed is:

1. An optical filter comprising
an inlet surface and an outlet surface which are substantially flat and parallel,
a plurality of locally planar and mutually locally parallel visible light absorbing sectors extending between the inlet surface and the outlet surface for a sector length (L), and
a plurality of solid transparent sectors made with at least one solid material transparent to visible light, each transparent sector of the plurality of transparent sectors being interposed between two absorbing sectors to create an alternation of transparent sectors and absorbing sectors adjacent to and in contact with each other,
wherein each visible light absorbing sector of the plurality of visible light absorbing sectors borders at most two transparent sectors of the plurality of transparent sectors, and/or wherein a distance between adjacent absorbing sectors of the plurality of absorbing sectors is substantially constant,
wherein each transparent sector of the plurality of transparent sectors is locally arranged and configured to have such a refractive power that,
given a third collimated light which impinges on the inlet surface at a local region of the inlet surface and along an inlet direction ($D_e$) in a plane of incidence (P) and deviated with respect to an incidence direction (D) by a non-zero angle of incidence ($\delta_{in}$) and smaller than an acceptance angle of the optical filter ($\vartheta_{acc}$) measured with respect to the incidence direction (D), in output from the outlet surface it is produced at least one component of transmitted light that exits from the outlet surface along a direction in the plane of incidence (P) and deviated with respect to the incidence direction (D) by a deviation angle ($\delta_{out}$) such that $$\frac{\delta_{in}}{|\delta_{in}|} = -\frac{\delta_{out}}{|\delta_{out}|}$$

applies and wherein a luminous transmittance for the third collimated light is significantly higher than 50%, higher than 60%, or higher than 70% net of losses due to reflections on the inlet and outlet surfaces, and/or
given a fourth collimated light which impinges on the outlet surface at a local region of the outlet surface and along an inlet direction ($D_e$) in the plane of incidence (P) and deviated with respect to the incidence direction (D) by a not-zero angle of incidence ($\delta_{in}$) and smaller than an acceptance angle of the filter ($\vartheta_{acc}$) measured with respect to the incidence direction (D), in output from the inlet surface it is produced at least one component of transmitted light that exits from the inlet surface along a direction in the plane of incidence (P) and deviated with respect to the incidence direction (D) by a deviation angle ($\delta_{out}$) such that $$\frac{\delta_{in}}{|\delta_{in}|} = -\frac{\delta_{out}}{|\delta_{out}|}$$

applies and wherein the luminous transmittance for the fourth collimated light is significantly higher than 50%, higher than 60%, or higher than 70% net of losses due to reflections on the inlet and outlet surfaces,
wherein a plane orthogonal to the inlet surface and containing a normal (N) to an absorbing sector of the plurality of absorbing sectors at the local region of the inlet surface defines the local plane of incidence (P), and the intersection between the local plane of incidence (P) and a surface of an absorbing sector defines the incidence direction (D) substantially common to the entire inlet surface, wherein each transparent sector of the plurality of transparent sectors comprises a layer of inhomogeneous transparent material having a non-uniform refractive index profile with gradient substantially parallel to the normal (N) to the absorbing sector, having a minimum value of refractive index ($n_e$) in proximity to walls of the transparent sector adjacent to the respective absorbing sectors and a maximum value of refractive index ($n_i$) in a central portion of the transparent sector.

2. The optical filter according to claim 1, wherein a thickness (d) of the transparent sector of the plurality of transparent sectors is between 10 μm and 300 μm, between 10 μm and 200 μm, or between 10 μm and 150 μm.

3. The optical filter according to claim 1,
wherein the surface of each absorbing sector of the plurality of absorbing sectors has a radius of curvature at least 5 times, at least 10 times, or at least 30 times greater than the distance between adjacent absorbing sectors; and/or
wherein the absorbing sectors of the plurality of absorbing sectors intersect the inlet surface and the outlet surface along concentric circles or along a spiral line or along substantially straight lines parallel to each other.

4. The optical filter according to claim 1, configured to transform a third collimated light and a fourth collimated light which respectively illuminates the inlet surface and the outlet surface along a direction in the plane of incidence (P) in a transmitted or filtered light in which
(i) for incidence directions of the input third and fourth collimated light inside an acceptance angle of the filter ($\vartheta_{acc}$) measured with respect to the incidence direction (D), a transmitted light has a profile of angular luminance in the plane of incidence (P) having values close to the maximum value for angles smaller than a cut angle ($\vartheta_{cut}$) measured with respect to the incidence direction (D), and zero elsewhere, said luminance profile being substantially independent or slightly dependent on the direction of the input collimated light, and
(ii) for incidence directions of the input third and fourth collimated light outside the acceptance angle of the filter, the transmitted light is substantially zero.

5. The optical filter according to claim 1, wherein
for a luminous transmittance $T(\vartheta_{in})$ of the optical filter for a third collimated light and a fourth collimated light which respectively illuminates the inlet surface and the outlet surface along a direction in the plane of incidence (P) which forms with the incidence direction (D) an input angle ($\vartheta_{in}$) such that $\vartheta_{in}>A\vartheta_{acc}$, the relation $T(\vartheta_{in})<BT_0$ applies, where A=1.3, A=1.2, or A=1.1 and where B=0.20, B=0.15, B=0.10, or B=0.05, and where $T_0\equiv<T(\vartheta_{in})>$ for $|\vartheta_{in}|<\vartheta_{1-HWHM}$ where $T(\vartheta_{1-HWHM})=T(0)/2$, and/or
for a luminous intensity $I(\vartheta_{out})$ of a light transmitted by the optical filter propagating in the plane of incidence (P) at an output angle ($\vartheta_{out}$) such that $\vartheta_{out}>C\vartheta_{cut}$, and for a diffused input light having substantially constant luminous intensity in all directions, the relation $I(\vartheta_{out})<D\,I_0$ applies, where C=1.3, C=1.2, or C=1.1 and where D=0.20, D=0.10, or D=0.05, and where $I_0\equiv<I(\vartheta_{in})>$ for $|\vartheta_{in}|<\vartheta_{2-HWHM}$ where $I(\vartheta_{2-HWHM})=T(0)/2$, and/or for a luminous intensity $I(\vartheta_{out})$ of a light transmitted by the optical filter propagating in the plane of incidence (P) at an output angle ($\vartheta_{out}$) such that $\vartheta_{out}<E\vartheta_{cut}$ for a diffused input light having substantially constant luminous intensity in all directions, the $I(\vartheta_{out})>F\,I_0$ applies, where E=0.7, E=0.8, or E=0.9 and where F=0.3, F=0.4, F=0.6, or F=0.8 and where $I_0\equiv<I(\vartheta_{in})>$ for $|\vartheta_{in}|<\vartheta_{2-HWHM}$ where $I(\vartheta_{2-HWHM})=T(0)/2$.

6. The optical filter according to claim 1, wherein the layer of inhomogeneous transparent material of the transparent sectors comprises a plurality of layers of different refractive index.

7. The optical filter according to claim 6, wherein the value of the refractive index of each layer of said plurality of layers varies along the normal (N) to the absorbing sector with dependence which substantially approximates a parabolic function and/or is monotonically decreasing from the central portion of the transparent sectors to the sector walls adjacent to the respective absorbing sectors, and/or
wherein the value of the refractive index of each layer of said plurality of layers varies along the normal (N) to the absorbing sector with dependence such as to confer to the transparent sector the refractive power of a lens with focal length (f), in which 0.5 L<f<2 L, 0.7 L<f<1.6 L, 0.7 L<f<1.4 L, 0.9 L<f<1.2 L, or the focal length (f) is substantially equal to the sector length (L).

8. The optical filter according to claim 6, wherein
wherein a first layer positioned in a central portion is made with a transparent material having a refractive index of internal layer corresponding to the maximum value of refractive index ($n_i$) and a pair of layers positioned at respective adjacent absorbing sectors are made with a transparent material having a refractive index of external layer corresponding to the minimum value of refractive index ($n_e$), and
wherein between the sector length (L), a thickness (d) of the transparent sector, the acceptance angle of the filter ($\vartheta_{acc}$) and the maximum value of refractive index ($n_i$) the relation applies:

$$L = G\frac{d}{\tan\left(a\sin\frac{\sin\theta_{acc}}{n_i}\right)}$$

where G<3, G<2, G<1.5 and/or G>0.3, G>0.5, G>0.7, or $$G \cong \frac{\pi}{4}.$$

9. The optical filter according to claim 6, wherein the plurality of layers of different refractive index is constituted by a first layer positioned in a central portion of a respective transparent sector and a pair of second layers, wherein each second layer of the pair of second layers is arranged alongside the first layer.

10. The optical filter according to claim 9,
wherein the first layer positioned in a central portion is made with a transparent material having a refractive index of internal layer corresponding to the maximum value of refractive index ($n_i$) and the pair of second layers is made with a transparent material having a refractive index of external layer corresponding to the minimum value of refractive index ($n_e$), and wherein between the sector length (L), a thickness (d) of the transparent sector, a total internal reflection angle ($\theta_{TIR}$) and the maximum value of refractive index ($n_i$) the relation applies:

$$L = G \frac{d}{\tan\left(a\sin\frac{\sin\theta_{TIR}}{n_i}\right)}$$

with the total internal reflection angle ($\theta_{TIR}$) equal to a total internal reflection angle at the interface between the internal layer and the external layer and where G<3, G<2, G<1.5 and/or G>0.3, G>0.5, G>0.7, or G≅1.

11. The optical filter according to claim 1, wherein the refractive index profile of each transparent sector varies continuously according to a substantially parabolic and/or monotonically decreasing trend from the central portion of the transparent sectors to the sector walls adjacent to the respective absorbing sectors, and/or wherein the refractive index profile of each transparent sector varies continuously according to a trend such as to locally confer to the transparent sector a refractive power of a GRIN cylindrical lens with focal length (f), wherein 0.5 L<f<2 L, 0.7 L<f<1.6 L, 0.7 L<f<1.4 L, 0.9 L<f<1.2 L, or the focal length (f) is substantially equal to the sector length (L).

12. The optical filter according to claim 11, wherein between the sector length (L), a thickness (d) of the transparent sector, the acceptance angle of the filter ($\vartheta_{acc}$) and the maximum value of refractive index ($n_i$) the relation applies:

$$L = G \frac{d}{\tan\left(a\sin\frac{\sin\theta_{acc}}{n_i}\right)}$$

where G<3, G<2, G<1.5 and/or G>0.3, G>0.5, G>0.7, or $$G \cong \frac{\pi}{4}.$$

13. An artificial light illumination device for reproducing the light of the sky and the sun, the artificial light illumination device comprising:

a direct light source configured to emit visible light along directions in a range across a main direction, the light emitted by the direct light source having a first calibrated color temperature (CCT);

an optical filter according to claim 1 placed downstream of the direct light source with respect to the main direction; and a diffused light source positioned downstream of the optical filter with respect to the main direction, the diffused light source being configured to transmit, at least in part, a filtered light in output from the filter and being configured to produce a diffused light component, having an angular luminance profile with a divergence at least 2 times, 3 times, or 4 times greater than a divergence of the filtered light, and/or by a CCT at least 1.2 times, 1.3 times, 1.5 times, or 1.8 times greater than the first CCT, and/or a CCT equal to 5600 Kelvin.

14. An optical filter comprising an inlet surface and an outlet surface which are substantially flat and parallel, a plurality of locally planar and mutually locally parallel visible light absorbing sectors extending between the inlet surface and the outlet surface for a sector length (L), and a plurality of solid transparent sectors made with at least one solid material transparent to visible light, each transparent sector of the plurality of transparent sectors being interposed between two absorbing sectors to create an alternation of transparent sectors and absorbing sectors adjacent to and in contact with each other, wherein each visible light absorbing sector of the plurality of visible light absorbing sectors borders at most two transparent sectors of the plurality of transparent sectors, and/or wherein a distance between adjacent absorbing sectors of the plurality of absorbing sectors is substantially constant, wherein each transparent sector of the plurality of transparent sectors is locally arranged and configured to have such a refractive power that, given a first collimated light which impinges on the inlet surface along an incidence direction (D) at a local region of the inlet surface, the transparent sector focuses the first collimated light along a first focal line orthogonal to a local plane of incidence (P), and/or given a second collimated light which impinges on the outlet surface along an incidence direction (D) at a local region of the outlet surface, the transparent sector focuses the second collimated light along a second focal line orthogonal to a local plane of incidence (P), wherein a plane orthogonal to the inlet surface and containing a normal (N) to an absorbing sector of the plurality of absorbing sectors at the local region of the inlet surface defines the local plane of incidence (P), and the intersection between the local plane of incidence (P) and a surface of an absorbing sector defines the incidence direction (D) substantially common to the entire inlet surface wherein each transparent sector of the plurality of transparent sectors comprises a layer of inhomogeneous transparent material having a non-uniform refractive index profile with gradient substantially parallel to the normal (N) to the absorbing sector, having a minimum value in proximity to walls of the transparent sector adjacent to the respective absorbing sectors and a maximum value in a central portion of the transparent sector.

15. The optical filter according to claim 14, wherein each transparent sector of the plurality of transparent sectors is locally arranged and configured to have such a refractive power that, given the first collimated light which impinges on the inlet surface along the incidence direction (D) at the local region of the inlet surface, the transparent sector focuses the first collimated light along the first focal line orthogonal to the local plane of incidence (P) and positioned at a first distance (f1) from the inlet surface measured along the incidence direction (D), wherein 0.5 L<f1<2 L, 0.7 L<f1<1.6 L, 0.7 L<f1<1.4 L, 0.9 L<f1<1.2 L, or the first focal distance (f1) is substantially equal to the sector length (L); and/or given the second collimated light which impinges on the outlet surface along the incidence direction (D) at the local region of the outlet surface, the transparent sector focuses the second collimated light along the second focal line orthogonal to the local plane of incidence (P) and positioned at a second distance ($f_2$) from the outlet surface measured along the incidence direction (D), wherein 0.5 L<$f_2$<2 L, 0.7 L<$f_2$<1.6 L, 0.7 L<$f_2$<1.4 L, 0.9 L<$f_2$<1.2 L, or further preferably wherein the second focal distance ($f_2$) is substantially equal to the sector length (L).

16. The optical filter according to claim 14, wherein a thickness (d) of the transparent sector of the plurality of transparent sectors is between 10 µm and 300 µm, between 10 µm and 200 µm, or between 10 µm and 150 µm.

17. The optical filter according to claim 14, wherein the surface of each absorbing sector of the plurality of absorbing sectors has a radius of curvature at least 5 times, at least 10 times, or at least 30 times greater than the distance between adjacent absorbing sectors; and/or wherein the absorbing sectors of the plurality of absorbing sectors intersect the inlet surface and the outlet surface along concentric circles or along a spiral line or along substantially straight lines parallel to each other.

\* \* \* \* \*